United States Patent
Manabe et al.

(10) Patent No.: US 7,635,505 B2
(45) Date of Patent: Dec. 22, 2009

(54) LIQUID CRYSTALLINE MEDIUM

(75) Inventors: Atsutaka Manabe, Bensheim (DE); Elvira Montenegro, Weinheim (DE); Gerald Scholz, Bensheim (DE); Detlef Pauluth, Ober-Ramstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 11/629,626

(22) PCT Filed: Jun. 15, 2005

(86) PCT No.: PCT/EP2005/006428

§ 371 (c)(1), (2), (4) Date: Aug. 27, 2007

(87) PCT Pub. No.: WO2005/123879

PCT Pub. Date: Dec. 29, 2005

(65) Prior Publication Data

US 2008/0128653 A1 Jun. 5, 2008

(30) Foreign Application Priority Data

Jun. 18, 2004 (DE) .................... 10 2004 029 602

(51) Int. Cl.
 *C09K 19/34* (2006.01)
 *C09K 19/30* (2006.01)
 *C09K 19/12* (2006.01)
 *C09K 19/20* (2006.01)
(52) U.S. Cl. ............. 428/1.1; 252/299.61; 252/299.63; 252/299.66; 252/299.67
(58) Field of Classification Search .............. 428/1.1, 428/1.3; 252/299.61, 299.63, 299.66, 299.67
See application file for complete search history.

(56) References Cited

U.S. PATENT DOCUMENTS

| | | | |
|---|---|---|---|
| 4,676,604 A | 6/1987 | Petrzilka | |
| 5,262,085 A | 11/1993 | Bartmann et al. | |
| 5,641,429 A | 6/1997 | Reiffenrath et al. | |
| 6,210,603 B1 | 4/2001 | Kondo et al. | |
| 6,565,933 B2 | 5/2003 | Tarumi et al. | |
| 6,596,350 B2 | 7/2003 | Tarumi et al. | |
| 6,669,998 B2* | 12/2003 | Tarumi et al. ................. | 428/1.1 |
| 6,685,996 B2 | 2/2004 | Tarumi et al. | |
| 6,929,833 B2 | 8/2005 | Tarumi et al. | |
| 7,029,731 B2 | 4/2006 | Tarumi et al. | |
| 7,033,652 B2* | 4/2006 | Heckmeier et al. ............ | 428/1.1 |
| 7,211,302 B2* | 5/2007 | Manabe et al. ............... | 428/1.1 |
| 2003/0186002 A1* | 10/2003 | Heckmeier et al. ............ | 428/1.1 |
| 2003/0197153 A1 | 10/2003 | Heckmeier et al. | |
| 2007/0237907 A1* | 10/2007 | Manabe et al. ............. | 428/1.27 |

FOREIGN PATENT DOCUMENTS

| | | |
|---|---|---|
| DE | 46 06 921 A1 | 9/1990 |
| EP | 0 334 911 B | 2/1993 |
| EP | 1 302 523 A | 4/2003 |
| WO | WO 98/23564 A | 6/1998 |
| WO | WO 2004/035710 A | 4/2004 |
| WO | WO 2005123880 | * 12/2005 |

* cited by examiner

*Primary Examiner*—Shean C Wu
(74) *Attorney, Agent, or Firm*—Millen, White, Zelano & Branigan, P.C.

(57) ABSTRACT

The invention relates to a liquid-crystalline medium based on a mixture of polar compounds, characterized in that it comprises one or more compounds of the formula I

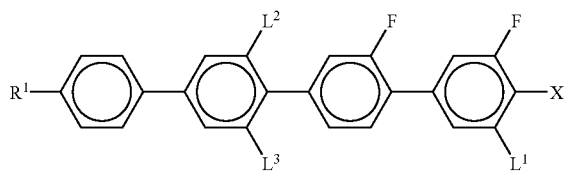

I and
one or more compounds selected from the group of the compounds of the formulae IA, IB and IC

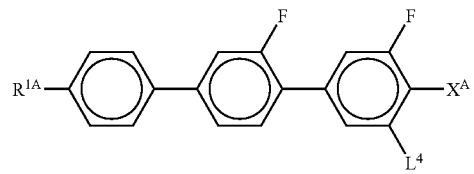

IA

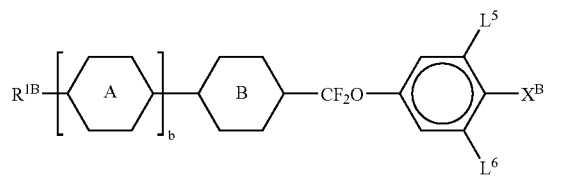

IB

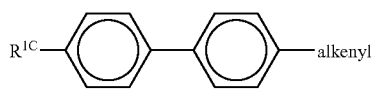

IC in which
$R^1$, $R^{1A}$, $R^{1B}$, $R^{1C}$, X, $X^A$, $X^B$, b and $L^{1-6}$, rings A and B have the meanings indicated in claim 1.

33 Claims, No Drawings

LIQUID CRYSTALLINE MEDIUM

The present invention relates to a liquid-crystalline medium, and to the use thereof for electro-optical purposes, and to displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and relatively low vapour pressure are desired.

Furthermore, LCoS™ displays and displays based on a birefringence effect, such as OCB displays, are also interesting.

OCB displays (optically compensated bend) are based on a birefringence effect and contain a liquid-crystal layer having a so-called "bend" structure. The "bend" cell, also known as "pi" cell, was first proposed by P. Bos et al., SID 83 Digest, 30 (1983) for an electrically controllable $\lambda/2$ plate, whereas the OCB mode for displays was described by Y. Yamaguchi, T. Miyashita and T. Uchida, SID 93 Digest, 277 (1993), and then in papers by T. Miyashita et al. in, inter alia, Proc. Eurodisplay, 149 (1993), J. Appl. Phys. 34, L177 (1995), SID 95 Digest, 797 (1995), C.-L. Kuo et al., SID 94 Digest, 927 (1994) and M. Suzuki, SID 96 Digest, 618 (1996). An OCB cell contains a liquid-crystal cell having a "bend" alignment and a liquid-crystal medium of positive $\Delta\epsilon$. In addition, the OCB displays disclosed in the above-mentioned documents contain one or more birefringent optical retardation films for preventing undesired light transmission by the "bend" cell in the dark state. OCB displays have a number of advantages over conventional displays based on twisted nematic (TN) cells, such as, for example, a wider viewing angle and shorter response times.

The above-mentioned documents have shown that liquid-crystalline phases must have high values for the optical anisotropy $\Delta n$ and a relatively high positive value for the dielectric anisotropy $\Delta\epsilon$ and preferably quite low values for the ratio between the elastic constants $K_{33}/K_{11}$ and for the viscosity in order to be usable for high-information display elements based on the OCB effect. The industrial application of the OCB effect in electro-optical displays requires LC phases which have to satisfy a multiplicity of requirements. Particularly important here are chemical resistance to moisture, air and physical effects, such as heat, radiation in the infrared, visible and ultraviolet regions and direct and alternating electrical fields. Furthermore, LC phases which can be used industrially are required to have a liquid-crystalline mesophase in a suitable temperature range, relatively high birefringence, positive dielectric anisotropy and low viscosity.

LCoS™ (liquid crystal on silicon) displays are known from the prior art and are available from Three-Five Systems Inc. (Tempe, Ariz., USA). LCoS™ microdisplays are reflective displays which typically contain a liquid-crystal layer having a twisted nematic structure between a silicon backplane and a cover glass. The silicon backplane is an array of pixels, each of which has a mirrored surface which at the same time acts as electrical conductor. Each pixel comprises a stationary mirror covered by an active liquid-crystal layer having a twisted nematic alignment which can be switched into homeotropic alignment by application of a voltage. LCoS™ microdisplays are small, with a diagonal of typically less than 1.0", but enable high resolutions from ¼ VGA (78 thousand pixels) to UXGA+ (over 2 million pixels).

Owing to the small pixel size, LCoS™ displays also have a very small cell thickness, which is typically about 1 micron. The liquid-crystalline phases used in these displays therefore have to have, in particular, high values for the optical anisotropy $\Delta n$, in contrast to conventional reflective-type LC displays, which usually require LC phases of low $\Delta n$.

OCB mode and LCoS™ displays can be operated as matrix displays. Matrix liquid-crystal displays (MLC displays) are known. Examples of non-linear elements which can be used to individually switch the individual pixels are active elements (i.e. transistors). The term "active matrix" is then used, and a distinction can be made between two types:
1. MOS (metal oxide semiconductor) or other diodes on silicon wafers as substrate,
2. Thin-film transistors (TFTs) on a glass plate as substrate.

In the case of type 1, the electro-optical effect used is usually dynamic scattering or the guest/host effect.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

In addition to liquid-crystal displays which use backlighting, i.e. are operated transmissively and if desired transflectively, reflective liquid-crystal displays are also particularly interesting. These reflective liquid-crystal displays use the ambient light for information display. They thus consume significantly less energy than backlit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation ($d \cdot \Delta n$). This low optical retardation results in usually acceptable low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

There thus continues to be a great demand for liquid-crystalline media for MLC, OCB, IPS, TN, LCoS or STN displays having high UV stability, relatively high $\Delta\Delta$ values, low thresholds and clearing points $\geq 70°$ C.

In TN (Schadt-Helfrich) cells, media are desired which facilitate the following advantages in the cells:
  extended nematic phase range (in particular down to low temperatures)
  storage-stable, even at extremely low temperatures
  the ability to switch at extremely low temperatures (outdoor use, automobile, avionics)
  increased resistance to UV radiation (longer life)
  higher optical anisotropies for faster response times owing to thinner cell thicknesses ($d \cdot \Delta n$)

The media available from the prior art do not enable these advantages to be achieved while simultaneously retaining the other parameters.

In the case of supertwisted cells (STN), media are desired which facilitate greater multiplexability and/or a lower threshold voltage and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention is based on the object of providing media, in particular for MLC, OCB, IPS, LCoS, TN or STN displays of this type, which do not provide the above-mentioned disadvantages or only do so to a lesser extent, and preferably at the same time provide relatively high clearing points, low thresholds and high values for the optical anisotropy $\Delta n$. The $\Delta n$ values should preferably be $\geq 0.07$, particularly preferably $\geq 0.08$. The mixtures should furthermore be distinguished by high UV stability.

It has now been found that this object can be achieved if media according to the invention are used in displays. The media according to the invention are distinguished by relatively high dielectric anisotropies and clearing points. At the same time, the media have very low threshold voltages and relatively low rotational viscosities $65_1$ and excellent UV stability.

The invention thus relates to a liquid-crystalline medium based on a mixture of polar compounds, characterised in that it comprises one or more compounds of the formula I

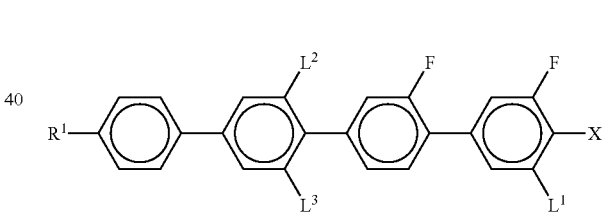

and
one or more compounds selected from the group of the compounds of the formulae IA, IB and IC

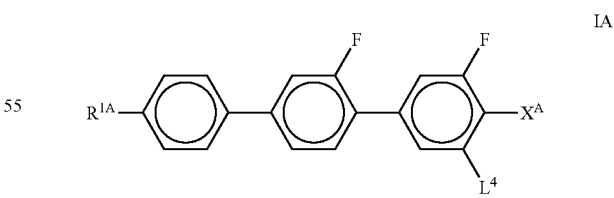

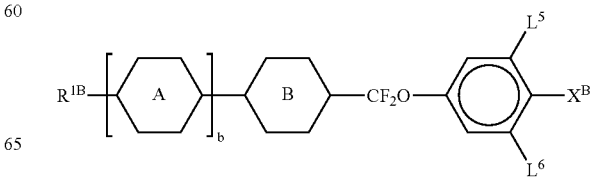

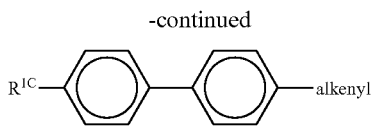

in which
R$^1$, R$^{1A}$, R$^{1B}$ and R$^{1C}$ each, independently of one another, denote a halogenated or unsubstituted alkyl or alkoxy radical having 1 to 15 C atoms, where, in addition, one or more CH$_2$ groups in these radicals may each be replaced, independently of one another, by

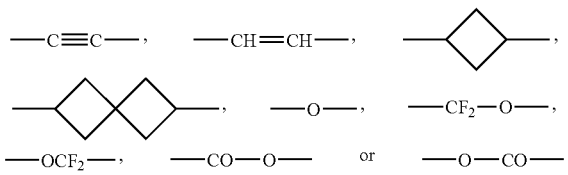

in such a way that O atoms are not linked directly to one another,

X, X$^A$, and X$^B$ each, independently of one another, denote F, Cl, CN, SF$_5$, SCN, NCS, halogenated alkyl radical, halogenated alkenyl radical, halogenated alkoxy radical or halogenated alkenyloxy radical having up to 6 C atoms,

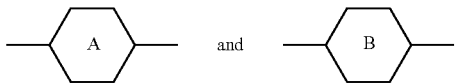

a) each, independently of one another, denote a 1,4-cyclohexenylene or 1,4-cyclohexylene radical, in which one or two non-adjacent CH$_2$ groups may be replaced by —O— or —S—,
b) a 1,4-phenylene radical, in which one or two CH groups may be replaced by N,
c) a radical from the group piperidine-1,4-diyl, 1,4-bicyclo[2.2.2]octylene, a naphthalene-2,6-diyl, decahydronaphthalene-2,6-diyl, 1,2,3,4-tetrahydronaphthalene-2,6-diyl, phenanthrene-2,7-diyl, fluorene-2,7-diyl, where the radicals a), b) and c) may be mono- or polysubstituted by halogen atoms,
L$^1$ to L$^6$ each, independently of one another, denote H or F, and
b denotes 0, 1 or 2.

Surprisingly, it has been found that liquid-crystalline mixtures comprising compounds of the formulae I and IA, IB and/or IC have relatively high clearing points, low thresholds and Δn values preferably of ≧0.07, in particular >0.08. Particular preference is given to compounds of the formula I in which L$^1$=F and L$^2$=L$^3$=H. Very particular preference is given to compounds of the formula I in which L$^1$=F, L$^2$=L$^3$=H and X=F, OCF$_3$, Cl, CF$_3$ or OCHF$_2$. X preferably denotes CN, F, SF$_5$, OCHF$_2$, OC$_2$F$_5$, OC$_3$F$_7$, NCS, OCHFCF$_3$, OCF$_2$CHFCF$_3$, OCF$_3$.

Fluorinated quaterphenyls are described in the prior art, for example in U.S. Pat. No. 6,669,998 B2, U.S. Pat. No. 6,565,933 B2, U.S. Pat. No. 6,596,350 A2, WO 89/02 884, WO 90/01 056, WO 91/03 450, EP 0 439 089 B1, DE 44 45 224, WO 98/235564, EP 1 302 523 A1, EP 1 346 995. However, the compounds of the formula I are not explicitly mentioned therein.

WO 2004/0357 10 A1 discloses compounds of the formula

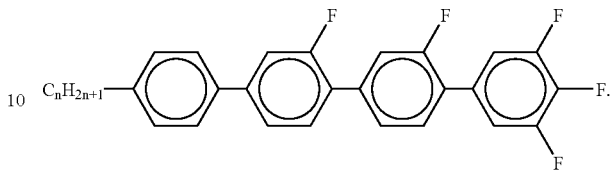

Compounds of the formula IA are known, for example, from EP 0 334 911. DE 40 06 921 describes compounds containing a CF$_2$O bridge. U.S. Pat. No. 4,676,604 discloses compounds of the formula IC.

The compounds of the formulae I, IA, IB and IC have a broad range of applications. Depending on the choice of substituents, these compounds can serve as base materials of which liquid-crystalline media are predominantly composed; however, it is also possible to add compounds of the formula I to liquid-crystalline base materials from other classes of compound in order, for example, to modify the dielectric and/or optical anisotropy of a dielectric of this type and/or in order to optimise its threshold voltage and/or its viscosity.

Surprisingly, the tetracyclic compounds according to the invention are very readily soluble. Thus, the influence of the compound of the formula I, in particular on the VHR with UV exposure, on the mixture concept according to the invention can even be observed when the compound of the formula I is present in concentrations of <1%.

In the pure state, the compounds of the formulae I, IA, IB and/or IC are colourless and form liquid-crystalline mesophases in a temperature range which is favourably located for electro-optical use. They are stable chemically, thermally and to light.

If R$^1$, R$^{1A}$, R$^{1B}$ and/or R$^{1C}$ denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6-, or 7-oxaoctyl, 2-, 3-, 4-, 5-, 6-, 7- or 8-oxanonyl, 2-, 3-, 4-, 5-, 6-, 7-, 8- or 9-oxadecyl.

If R$^1$, R$^{1A}$, R$^{1B}$ and/or R$^{1C}$ denotes an alkyl radical in which one CH$_2$ group has been replaced by —CH=CH—, this may be straight-chain or branched. It is preferably straight-chain and has 2 to 10 C atoms. Accordingly, it denotes in particular vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

If R$^1$, R$^{1A}$, R$^{1B}$ and/or R$^{1C}$ denotes an alkyl radical in which one CH$_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 C atoms. Accordingly, they denote in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 2-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If $R^1$, $R^{1A}$, $R^{1B}$ and/or $R^{1C}$ denotes an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has 4 to 12 C atoms. Accordingly, it denotes in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl, 9-methacryloyloxynonyl.

If $R^1$, $R^{1A}$, $R^{1B}$ and/or $R^{1C}$ denotes an alkyl or alkenyl radical which is monosubstituted by CN or $CF_3$, this radical is preferably straight-chain. The substitution by CN or $CF_3$ is in any desired position.

If $R^1$, $R^{1A}$, $R^{1B}$ and/or $R^{1C}$ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds containing branched wing groups $R^1$, $R^{1A}$, $R^{1B}$ and/or $R^{1C}$ may occasionally be of importance owing to better solubility in the conventional liquid-crystalline base materials, but in particular as chiral dopants if they are optically active. Smectic compounds of this type are suitable as components of ferroelectric materials.

Branched groups of this type generally contain not more than one chain branch. Preferred branched radicals $R^1$, $R^{1A}$, $R^{1B}$ and/or $R^{1C}$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy, 1-methylheptyloxy.

If $R^1$, $R^{1A}$, $R^{1B}$ and/or $R^{1C}$ represents an alkyl radical in which two or more $CH_2$ groups have been replaced by —O— and/or —CO—O—, this may be straight-chain or branched. It is preferably branched and has 3 to 12 C atoms. Accordingly, it denotes in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl, 5,5-bis(ethoxycarbonyl)hexyl.

X, $X^A$ and $X^b$ in the compounds of the formulae I, IA and IB preferably denote, independently of one another, F, Cl, CN, NCS, $CF_3$, $C_2F_5$, $C_3F_7$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCFHCFHCF_3$, $OCH_2CF_2CF_3$, $OCF_2CF_2CF_3$, $OCF_2CFHCFH_2$, $OCF_2CH_2CF_2H$, $OCFHCF_2CFH_2$, $OCFHCFHCF_2H$, $OCFHCH_2CF_3$, $OCH_2CFHCF_3$, $OCH_2CF_2CF_2H$, $OCF_2CFHCH_3$, $OCF_2CH_2CFH_2$, $OCFHCF_2CH_3$, $OCFHCFHCFH_2$, $OCFHCH_2CF_3$, $OCH_2CF_2CFH_2$, $OCH_2CFHCF_2H$, $OCF_2CH_2CH_3$, $OCFHCFHCH_3$, $OCFHCH_2CFH_2$, $OCH_2CF_2CH_3$, $OCH_2CFHCFH_2$, $OCH_2CH_2CF_2H$, $OCHCH_2CH_3$, $OCH_2CFHCH_3$, $OCH_2CH_2CF_2H$, $OCClFCF_3$, $OCClFCClF_2$, $OCClFCFH_2$, $OCFHCCl_2F$, $OCClFCF_2H$, $OCClFCClF_2$, $OCF_2CClH_2$, $OCF_2CCl_2H$, $OCF_2CCl_2F$, $OCF_2CClFH$, $OCF_2CClF_2$, $OCF_2CF_2CClF_2$, $OCF_2CF_2CCl_2F$, $OCClFCF_2CF_3$, $OCClFCF_2CF_2H$, $OCClFCF_2CClF_2$, $OCClFCFHCF_3$, $OCClFCClFCF_3$, $OCCl_2CF_2CF_3$, $OCClHCF_2CF_3$, $OCClFCF_2CF_3$, $OCClFCClFCF_3$, $OCF_2CClFCFH_2$, $OCF_2CF_2CCl_2F$, $OCF_2CCl_2CF_2H$, $OCF_2CH_2CClF_2$, $OCClFCF_2CFH_2$, $OCFHCF_2CCl_2F$, $OCClFCFHCF_2H$, $OCClFCClFCF_2H$, $OCFHCFHCClF_2$, $OCClFCH_2CF_3$, $OCFHCCl_2CF_3$, $OCCl_2CFHCF_3$, $OCH_2CClFCF_3$, $OCCl_2CF_2CF_2H$, $OCH_2CF_2CClF_2$, $OCF_2CClFCH_3$, $OCF_2CFHCCl_2H$, $OCF_2CCl_2CFH_2$, $OCF_2CH_2CCl_2F$, $OCClFCF_2CH_3$, $OCFHCF_2CCl_2H$, $OCClFCClFCFH_2$, $OCFHCFHCCl_2F$, $OCClFCH_2CF_3$, $OCFHCCl_2CF_3$, $OCCl_2CF_2CFH_2$, $OCH_2CF_2CCl_2F$, $OCCl_2CFHCF_2H$, $OCClHCClFCF_2H$, $OCF_2CClHCClH_2$, $OCF_2CH_2CCl_2H$, $OCClFCFHCH_3$, $OCF_2CClFCCl_2H$, $OCClFCH_2CFH_2$, $OCFHCCl_2CFH_2$, $OCCl_2CF_2CH_3$, $OCH_2CF_2CClH_2$, $OCCl_2CFHCFH_2$, $OCH_2CClFCFCl_2$, $OCH_2CH_2CF_2H$, $OCClHCClHCF_2H$, $OCH_2CCl_2CF_2H$, $OCClFCH_2CH_3$, $OCFHCH_2CCl_2H$, $OCClHCFHCClH_2$, $OCH_2CFHCCl_2H$, $OCCl_2CH_2CF_2H$, $OCH_2CCl_2CF_2H$, CH=$CF_2$, CF=$CF_2$, OCH=$CF_2$, OCF=$CF_2$, CH=CHF, OCH=CHF, CF=CHF, OCF=CHF, in particular F, Cl, CN, NCS, $CF_3$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCF_2CF_2CF_3$ or $OCF_2CHFCF_3$.

The compounds of the formulae I are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants known per se which are not mentioned here in greater detail. The compounds of the formula I can be prepared, for example, as follows:

Scheme 1
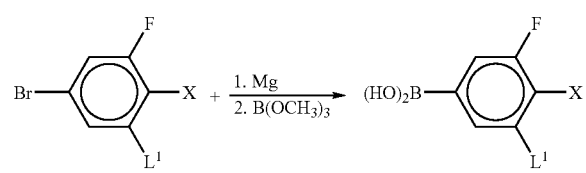
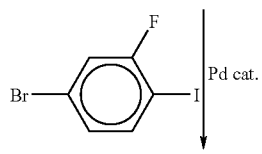
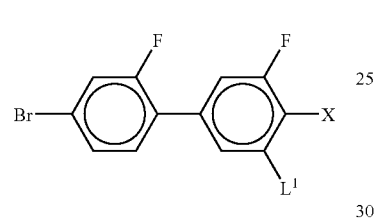
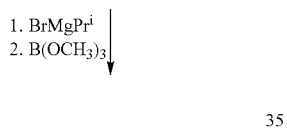
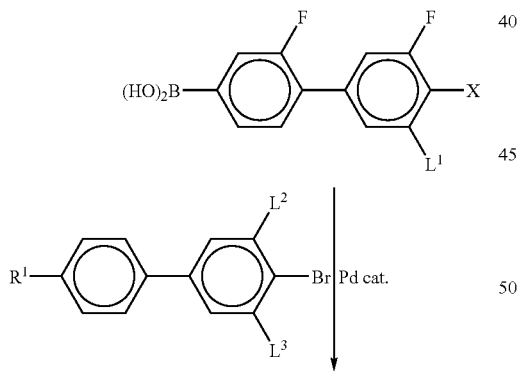
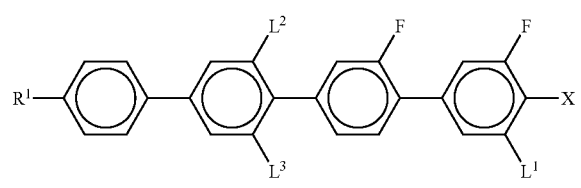
Scheme 2
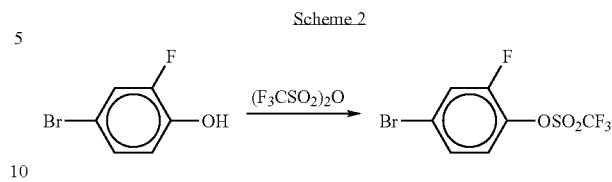
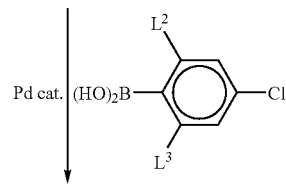
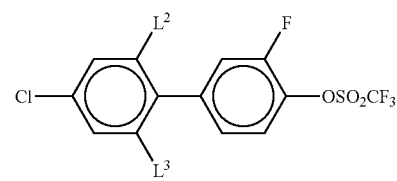
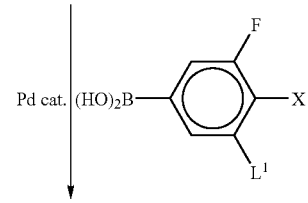
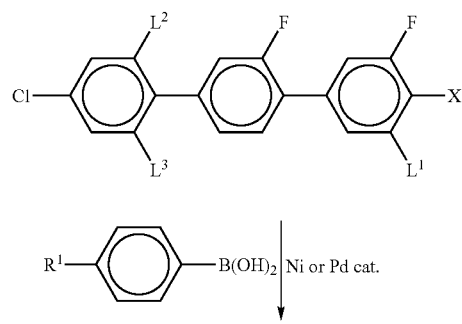
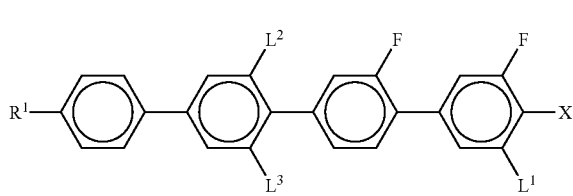

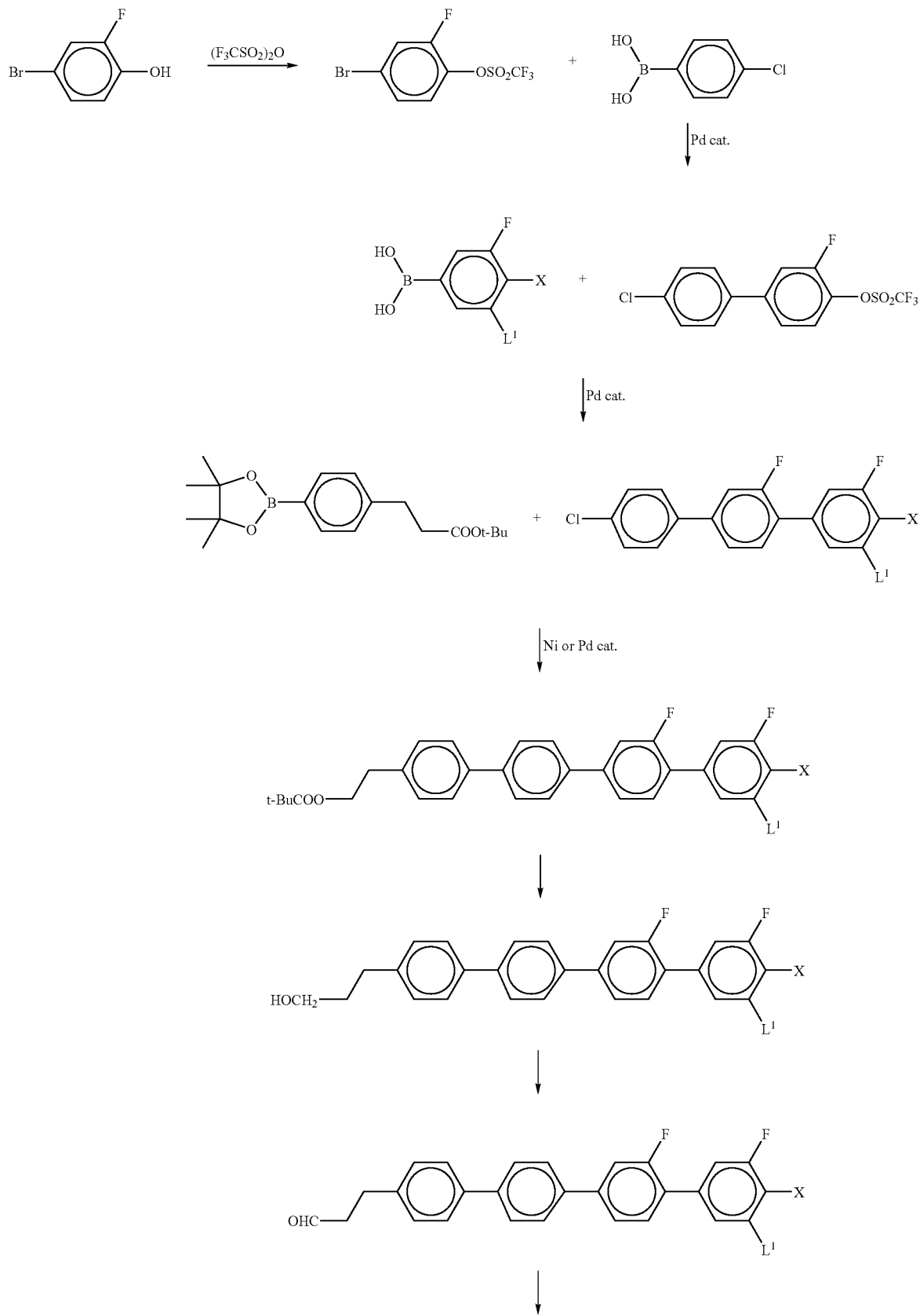

-continued

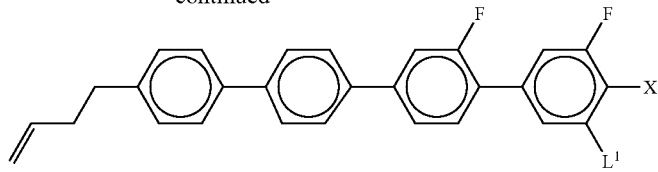

The invention also relates to electro-optical displays, such as, for example, STN or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance) which is located in the cell which contain media of this type, and to the use of these media for electro-optical purposes.

The liquid-crystal mixtures according to the invention enable a significant widening of the available parameter latitude. The achievable combinations of clearing point, viscosity at low temperature, thermal and UV stability and high optical anisotropy are far superior to previous materials from the prior art.

The mixtures according to the invention are particularly suitable for fast-switching monitors, TV sets, TV/monitor combination units and high Δn TFT applications, such as, for example, projection television sets, LCoS and OCB.

The liquid-crystal mixtures according to the invention, while retaining the nematic phase down to −20° C. and preferably down to −30° C., particularly preferably down to −40° C., enable a clearing point above 60° C., preferably above 70° C., particularly preferably above 75° C., simultaneously dielectric anisotropy values Δε of ≧4, preferably ≧5, and a high value for the specific resistance to be achieved, enabling excellent STN and MLC displays to be obtained. In particular, the mixtures are characterised by low operating voltages.

The TN thresholds are below 2.5 V, preferably below 2.0 V, particularly preferably <1.8 V.

It goes without saying that, through a suitable choice of the components of the mixtures according to the invention, it is also possible for higher clearing points (for example above 110° C.) to be achieved at higher threshold voltages or lower clearing points to be achieved at lower threshold voltages with retention of the other advantageous properties. At viscosities correspondingly increased only slightly, it is likewise possible to obtain mixtures having higher Δε and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The flow viscosity $v_{20}$ at 20° C. is preferably <60 mm$^2$·s$^{-1}$, particularly preferably <50 mm$^2$·s$^{-1}$. The rotational viscosity $\gamma_1$ of the mixtures according to the invention at 20° C. is preferably <130 mPa·s, particularly preferably <100 mPa·s. The nematic phase range is preferably at least 90°, in particular at least 100°. This range preferably extends at least from −20° to +80°.

A short response time is desired in liquid-crystal displays. This applies in particular to displays which are capable of video reproduction. For displays of this type, response times (total: $t_{on}+t_{off}$) of at most 25 ms are required. The upper limit for the response time is determined by the image refresh frequency. Besides the rotational viscosity $\gamma_1$, the tilt angle also influences the response time.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formulae I, IA, IB and IC exhibit a significantly smaller decrease in the HR on exposure to UV than analogous mixtures comprising cyanophenylcyclohexanes of the formula

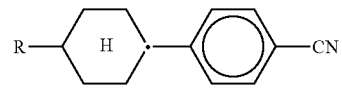

or esters of the formula

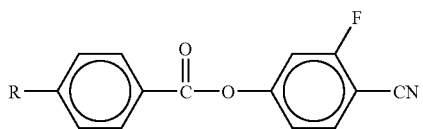

instead of the compounds of the formulae I, IA, IB and IC.

The UV stability of the mixtures according to the invention is considerably better, i.e. they exhibit a significantly smaller decrease in the HR on exposure to UV. Even low concentrations of the compounds (<10% by weight) of the formula I increase the HR in the mixtures by 6% or more compared with mixtures from the prior art.

Particularly preferred compounds of the formula I are compounds of the formulae I-1 to I-10

I-1

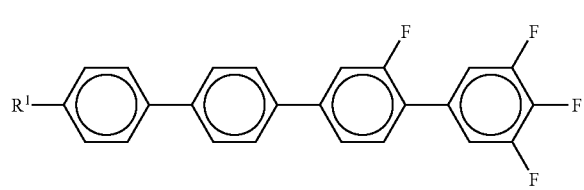

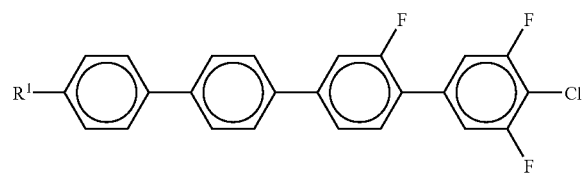
I-2

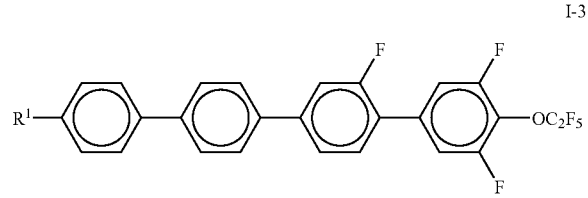
I-3

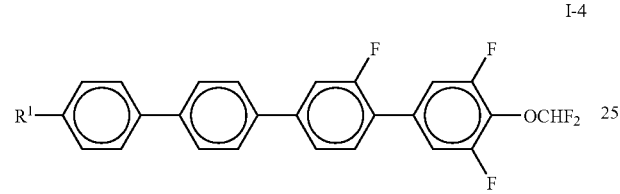
I-4

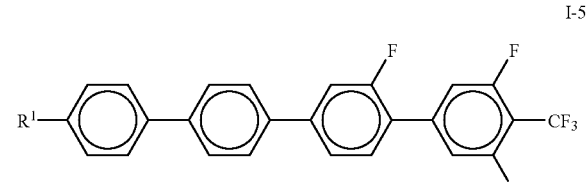
I-5

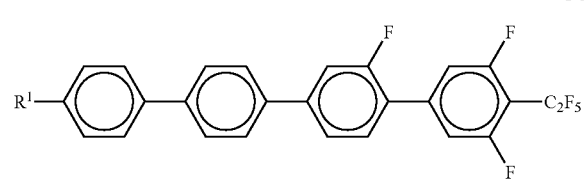
I-6

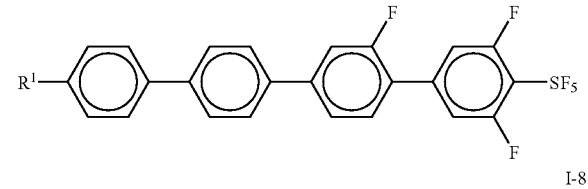
I-7

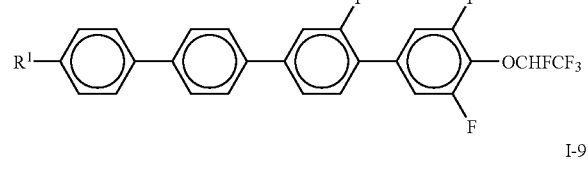
I-8

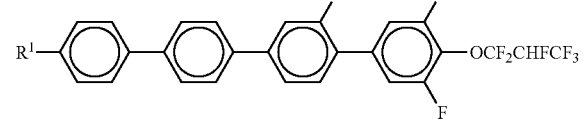
I-9

I-10 in which $R^1$ has the meaning indicated in the formula I. $R^1$ preferably denotes alkyl, furthermore alkenyl.

Of these preferred compounds, particular preference is given to those of the formulae I-1, I-4, I-7 and I-10, in particular those of the formulae I-1 and I-10.

$R^1$ in the sub-formulae I-1 to I-10 preferably denotes $C_2H_5$, n-$C_3H_7$, n-$C_5H_{11}$, furthermore $CH_3$, n-$C_4H_9$, n-$C_6H_{13}$, n-$C_7H_{15}$, $CH_2$=CH, $CH_3CH$=CH, $CH_2$=$CHCH_2CH_2$ or $CH_3CH$=$CHCH_2CH_2$. $R^1$ very particularly preferably denotes n-$C_3H_7$.

The medium preferably comprises at least one of the following compounds

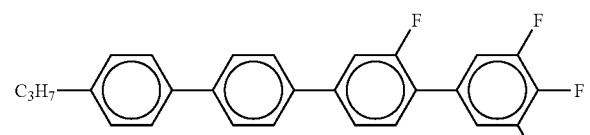

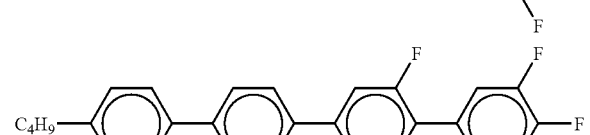

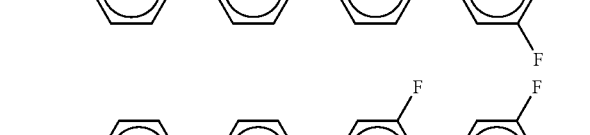

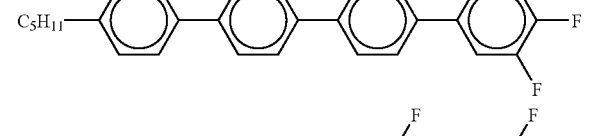

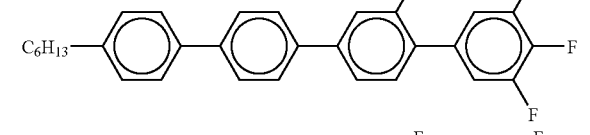

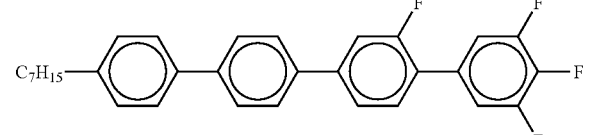

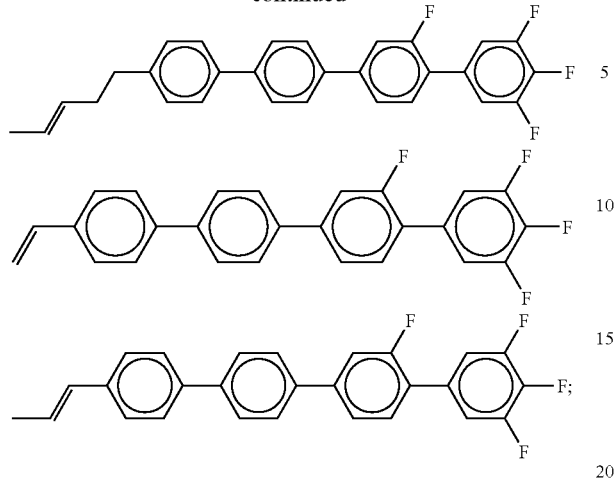

The medium preferably comprises the compound

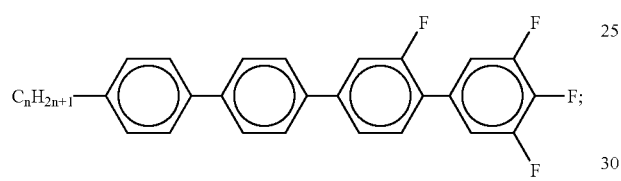

in which n=3 or 5.

Preference is likewise given to media, which comprise a compound where n=3 and a compound where n=5.

Particularly preferred compounds of the formula IA are the compounds of the formulae IA-1 to IA-12

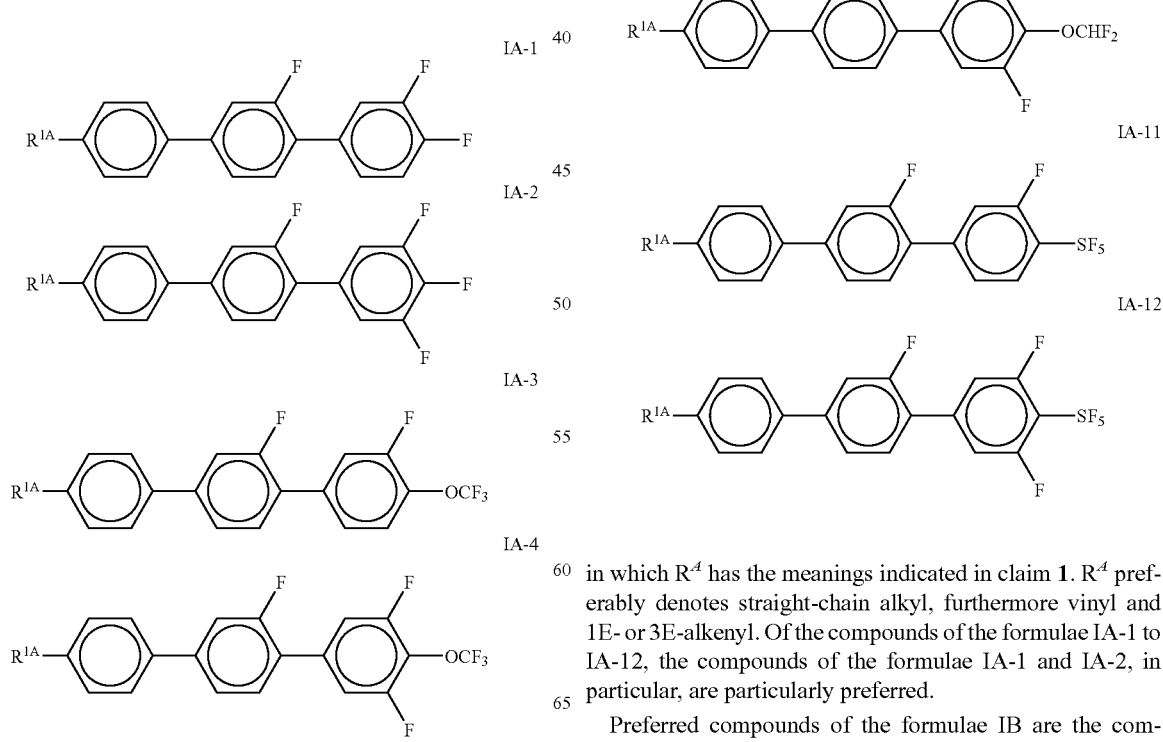

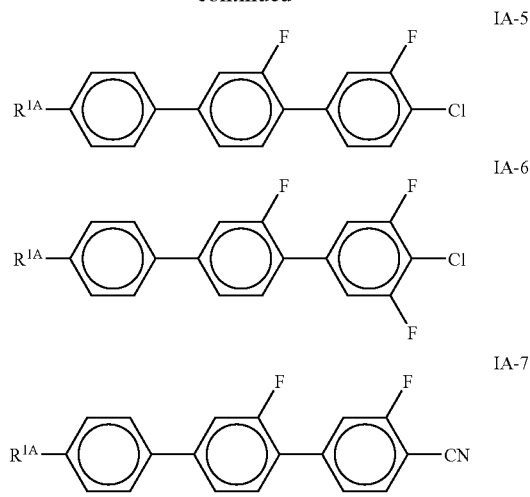

in which $R^A$ has the meanings indicated in claim 1. $R^A$ preferably denotes straight-chain alkyl, furthermore vinyl and 1E- or 3E-alkenyl. Of the compounds of the formulae IA-1 to IA-12, the compounds of the formulae IA-1 and IA-2, in particular, are particularly preferred.

Preferred compounds of the formulae IB are the compounds of the formulae IB-1 to IB-29

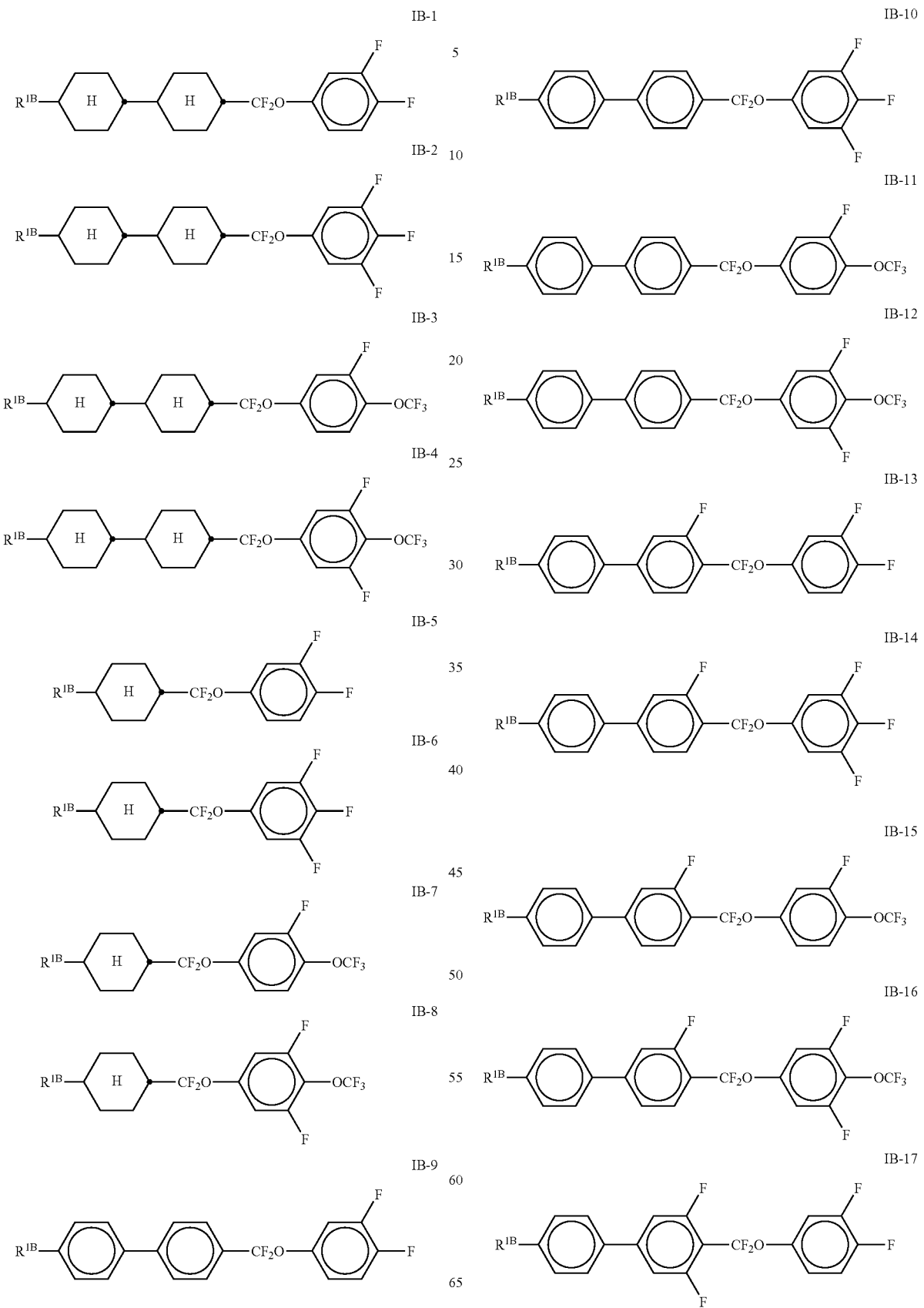

in which $R^{1B}$ has the meanings indicated in claim 1. $R^{1B}$ preferably denotes straight-chain alkyl, furthermore vinyl, 1E- or 3E-alkenyl.

Of the compounds IB-1 to IB-22, the compounds of the formulae IB-1, IB-2, IB-5, IB-6, IB-17, IB-18 and IB-29, in particular, are particularly preferred.

Of the compounds of the formula IC, the compounds of the formula IC-1 and IC-2, in particular, are preferred:

in which alkyl denotes straight-chain alkyl having 1-9 C atoms, and alkenyl or alkenyl* each, independently of one another, denotes straight-chain alkenyl having 2 to 9 C atoms, preferably vinyl, 1E-alkenyl or 3E-alkenyl.

Particularly preferred compounds of the formula IC are

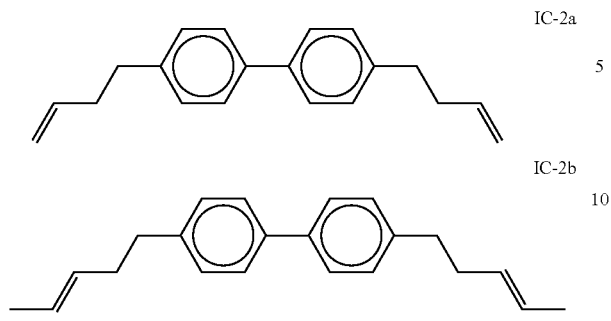

Preferred embodiments are indicated below:

The medium comprises one, two or more compounds of the formulae I-1 to I-10;

The medium preferably comprises one or more compounds of the formula IA-1 to IA-12;

The medium comprises one, two, three or four compounds of the formula IA. The concentration of the compound(s) of the formula IA in the mixture according to the invention is 2-50% by weight, preferably 2-40% by weight, in particular 5-40% by weight;

The medium comprises one, two, three or four compounds of the formula IB. The concentration of the compound(s) of the formula 1B in the mixture according to the invention is 2-50% by weight, preferably 5-40% by weight;

The medium comprises one, two, three or four compounds of the formula IC. The concentration of the compound(s) of the formula 1C in the mixture according to the invention is 2-50% by weight, preferably 5-40% by weight.

The medium additionally comprises one or more compounds selected from the group consisting of the general formulae II to VI:

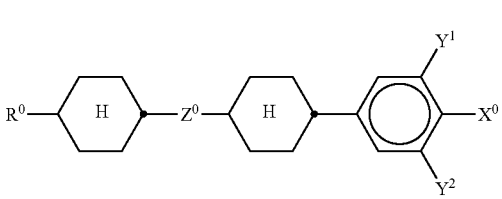

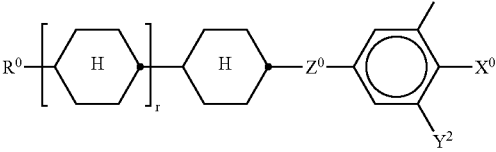

in which the individual radicals have the following meanings:

$R^0$ n-alkyl, alkoxy, oxaalkyl, fluoroalkyl or alkenyl, each having up to 9 C atoms, $X^0$ F, Cl, halogenated alkyl, halogenated alkenyl, halogenated oxaalkyl, halogenated alkenyloxy or halogenated alkoxy having up to 6 C atoms, $Z^0$ —$C_2F_4$—, —CF=CF—, —CH=CF—, —CF=CH—, —CH=CH—, —$C_2H_4$—, —$(CH_2)_4$—, —$OCH_2$—, —$CH_2O$—, —$CF_2O$— or —$OCF_2$—, $Y^1$ to $Y^4$ each, independently of one another, H or F, r 0 or 1.

The compound of the formula VI in which $Z^0=CF_2O$ is not identical with the compounds of the formula IB.

The compound of the formula IV is preferably

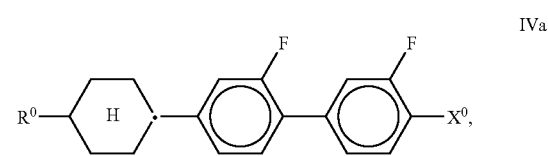

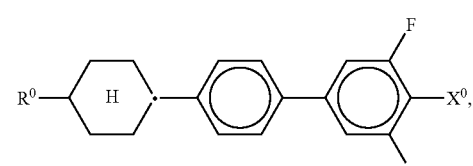

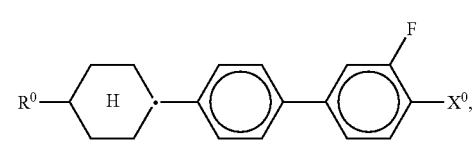

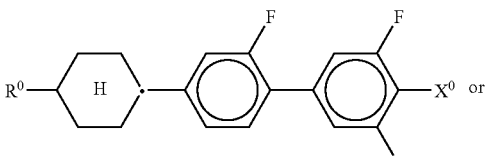

-continued

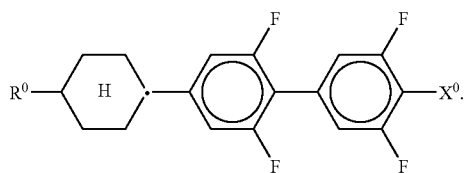
IVe

The medium additionally comprises one or more compounds selected from the group consisting of the general formulae VII to XII:

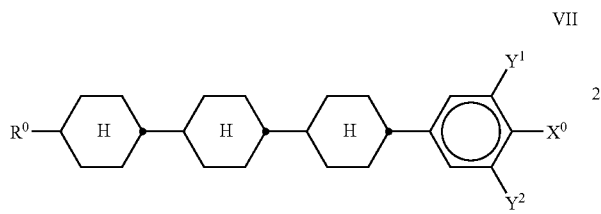
VII

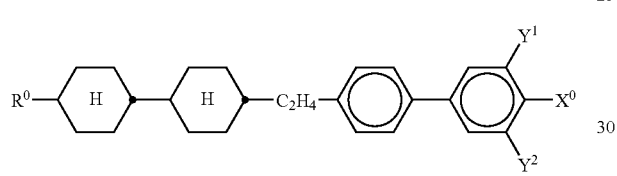
VIII

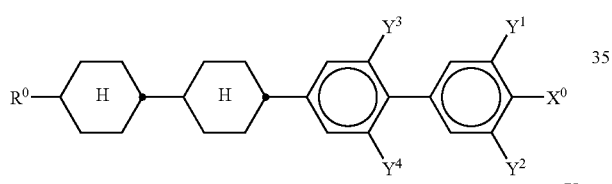
IX

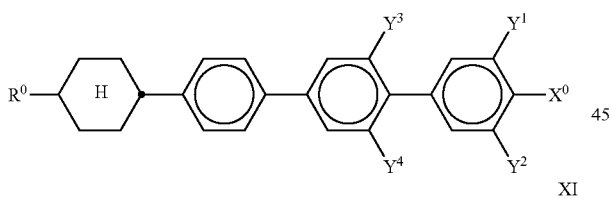
X

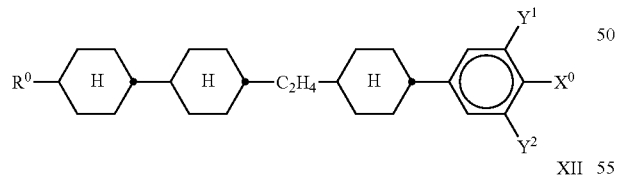
XI

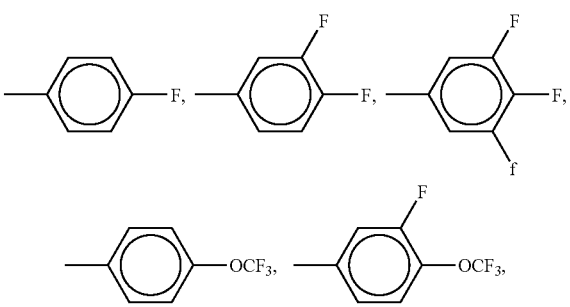
XII in which $R^0$, $X^0$ and $Y^{1-4}$ each, independently of one another, have one of the meanings indicated in claim 6. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 6 C atoms.

The medium additionally comprises one or more compounds of the formulae E-a to E-c

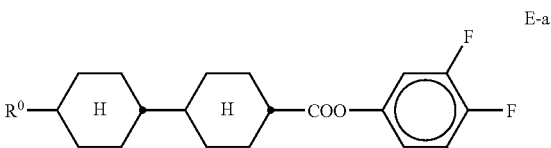
E-a

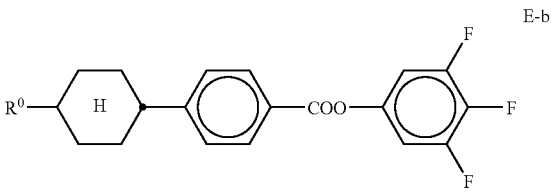
E-b

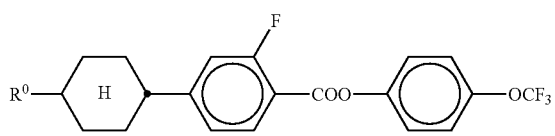
E-c in which $R^0$ has the meanings indicated in claim 6;

The proportion of the compounds of the formulae E-a and/or E-b is preferably 0-30% by weight, in particular 5-25% by weight;

The proportion of compounds of the formulae I, IA, IB and/or IC together in the mixture as a whole is at least 10% by weight, preferably ≧15% by weight and in particular ≧20% by weight;

The proportion of compounds of the formula I in the mixture as a whole is 0.01 to 30, particularly preferably 0.1 to 20% by weight;

The proportion of compounds of the formulae II to VI in the mixture as a whole is 10 to 80% by weight;

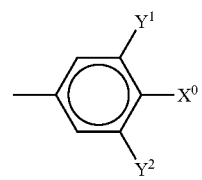

is preferably

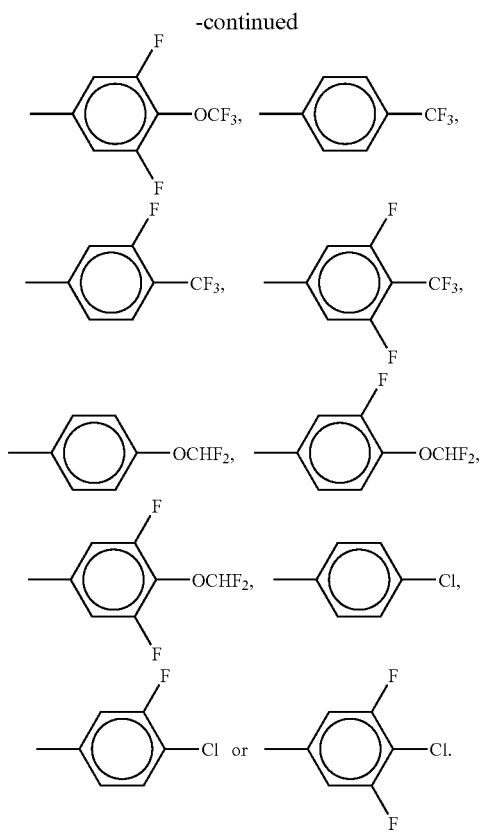

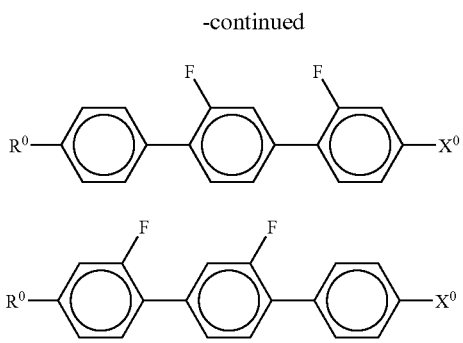

in which R⁰ and X⁰ have the meanings indicated above. X⁰ preferably denotes F or Cl. The concentration of the compounds of the formulae XIII to XVIII is preferably 0.05-30% by weight, in particular 1-25% by weight.

The medium preferably comprises 5-35% by weight of the compound IVa.

The medium preferably comprises one, two or three compounds of the formula IVa in which X⁰ denotes F or OCF₃.

The medium preferably comprises one or more compounds of the formulae IIa to IIg The medium comprises compounds of the formulae II, III, IV, V and/or VI;

R⁰ is straight-chain alkyl or alkenyl having 2 to 7 C atoms;

The medium essentially consists of compounds of the formulae I, IA, IB, IC and II-VI, where essentially means ≧50% by weight.

The medium comprises further compounds, preferably selected from the following group consisting of the general formulae XIII to XVIII:

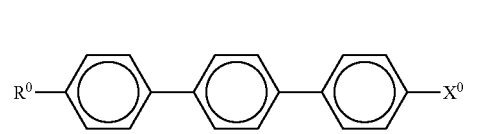

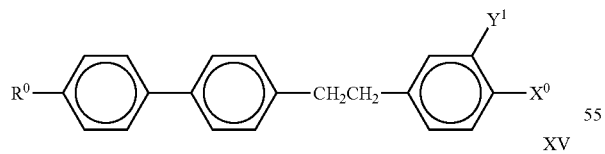

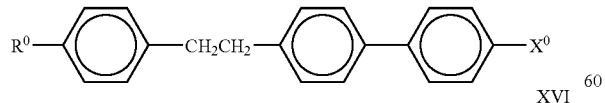

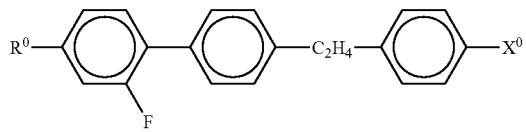

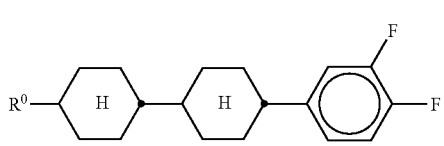

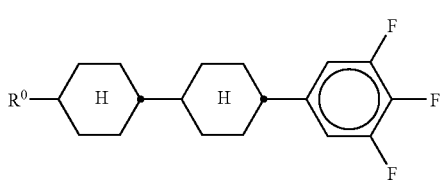

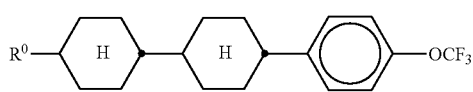

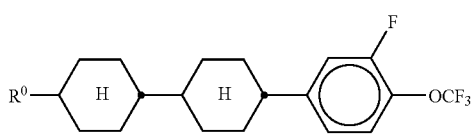

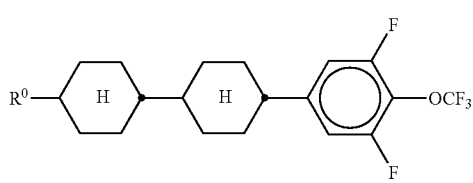

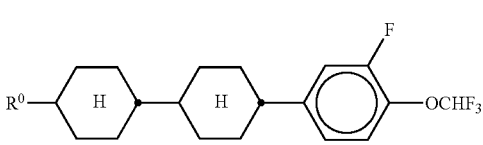

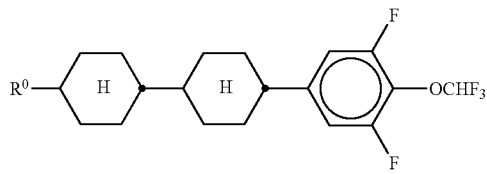
IIg in which R⁰ has the meanings indicated above. In the compounds of the formulae IIa-IIg, R⁰ preferably denotes methyl, ethyl, n-propyl, n-butyl and n-pentyl.

The weight ratio I or I+IA+IB+IC: (II+III+IV+V+VI) is preferably 1:10 to 10:1.

The medium essentially consists of compounds selected from the group consisting of the general formulae IA, IB and/or IC and I to XII.

The proportion of the compounds of the formula IVb, IVc and/or IVd in which X⁰ denotes fluorine and R⁰ denotes $CH_3$, $C_2H_5$, $n-C_3H_7$, $n-C_4H_9$ or $n-C_5H_{11}$ in the mixture as a whole is 2 to 25% by weight, in particular 2 to 20% by weight.

The medium preferably comprises compounds of the formulae II to VI in which R⁰ denotes methyl. The medium according to the invention particularly preferably comprises compounds of the formulae

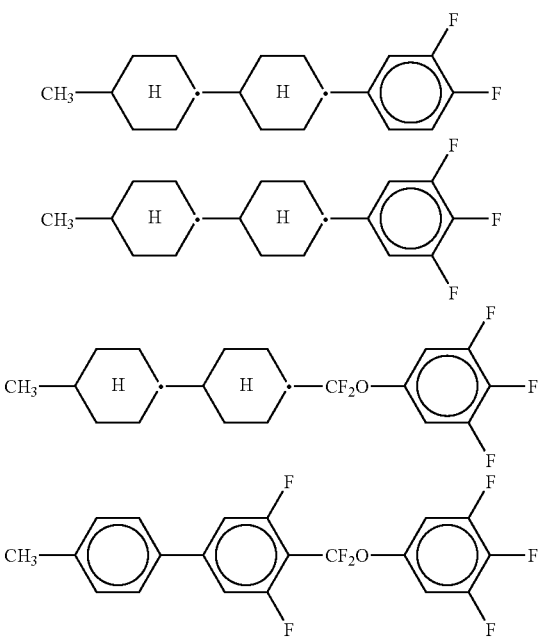

The medium preferably comprises one, two or more, preferably one, two or more dioxane compounds of the formulae D-1 to D-4

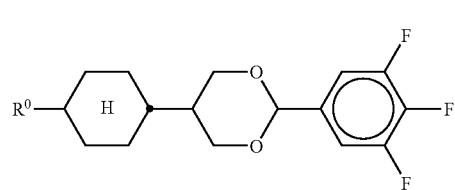
D-1

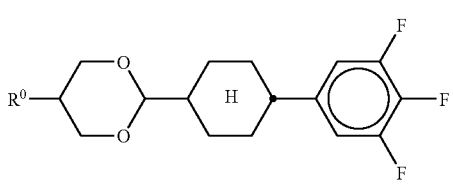
D-2

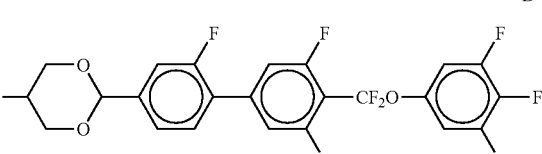
D-3

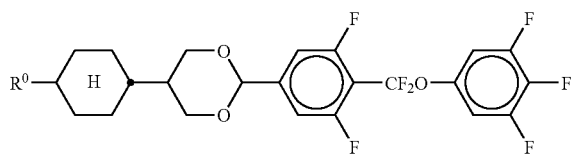
D-4 in which R⁰ has the meanings indicated above.

The proportion of the dioxane compounds D-1 to D-4 in the mixtures according to the invention is preferably 0-40% by weight, in particular 5-35% by weight and very particularly preferably 8-30% by weight.

The medium additionally comprises one, two or more bicyclic compounds of the formulae Z-1 to Z-9

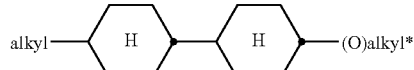
Z-1

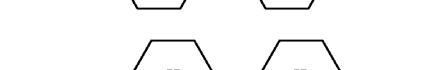
Z-2

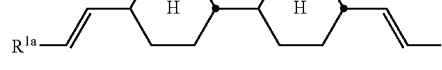
Z-3

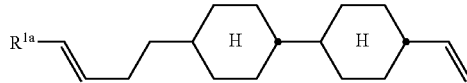
Z-4

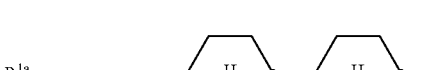
Z-5

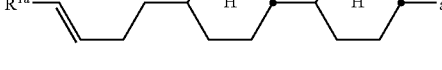
Z-6

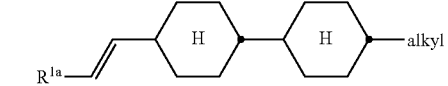
Z-7

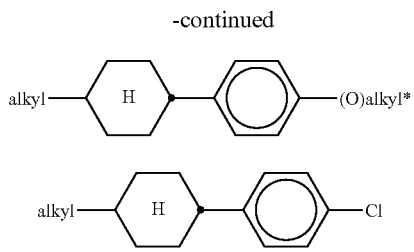

in which $R^{1a}$ and $R^{2a}$ each, independently of one another, denote H, $CH_3$, $C_2H_5$ or n-$C_3H_7$. Alkyl and alkyl* each, independently of one another, denote a straight-chain or branched alkyl chain having 1-7 C atoms. $R^0$ has the meanings indicated above. In the compounds of the formulae Z-6, Z-7 and Z-9, $R^0$ preferably denotes straight-chain alkyl or alkenyl Of the said bicyclic compounds, particular preference is given to the compounds of the formulae Z-1, Z-2, Z-5, Z-6, Z-8 and Z-9.

The medium additionally comprises one, two or more compounds having fused rings of the formulae AN1 to AN11:

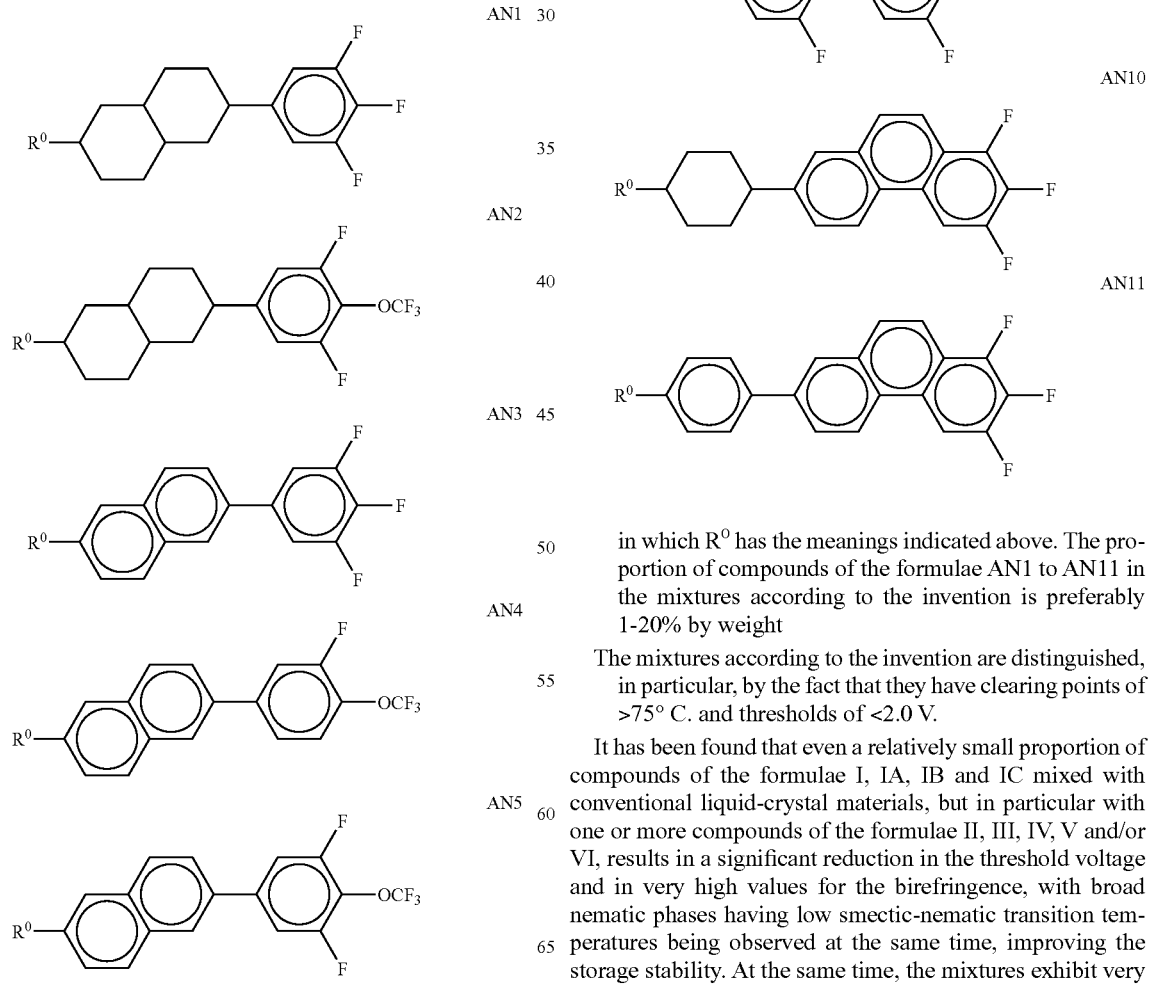

in which $R^0$ has the meanings indicated above. The proportion of compounds of the formulae AN1 to AN11 in the mixtures according to the invention is preferably 1-20% by weight The mixtures according to the invention are distinguished, in particular, by the fact that they have clearing points of >75° C. and thresholds of <2.0 V.

It has been found that even a relatively small proportion of compounds of the formulae I, IA, IB and IC mixed with conventional liquid-crystal materials, but in particular with one or more compounds of the formulae II, III, IV, V and/or VI, results in a significant reduction in the threshold voltage and in very high values for the birefringence, with broad nematic phases having low smectic-nematic transition temperatures being observed at the same time, improving the storage stability. At the same time, the mixtures exhibit very good values for the VHR on UV exposure.

The term "alkyl" or "alkyl*" encompasses straight-chain and branched alkyl groups having 1-7 carbon atoms, in particular the straight-chain groups methyl, ethyl, propyl, butyl, pentyl, hexyl and heptyl. Groups having 1-6 carbon atoms are generally preferred.

The term "alkenyl" or "alkenyl*" encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m 1-6 or m=0 and n=1-3.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high $K_1$ values and thus have significantly faster response lines than the mixtures from the prior art.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae IA, IB and/or IC and I+II+III+IV+V+VI depends substantially on the desired properties, on the choice of the components of the formulae I, IA, IB, IC, II, III, IV, V and/or VI, and the choice of any further components that may be present.

Suitable mixing ratios within the range indicated above can easily be determined from case to case.

The total amount of compounds of the formulae IA, IB and/or IC and I to XII in the mixtures according to the invention is not crucial. The mixtures can therefore comprise one or more further components for the purposes of optimisation of various properties. However, the observed effect on the addressing times and the threshold voltage is generally greater, the higher the total concentration of compounds of the formulae IA, IB and/or IC and I to XVIII.

In a particularly preferred embodiment, the media according to the invention comprise compounds of the formula II to VI (preferably II, III and/or IV, in particular IVa) in which $X^0$ denotes F, $OCF_3$, $OCHF_2$, OCH=$CF_2$, OCF=$CF_2$ or $OCF_2$—$CF_2H$. A favourable synergistic effect with the compounds of the formulae I and IA, IB and/or IC results in particularly advantageous properties. In particular, mixtures comprising compounds of the formulae I, IA, IB and/or IC and IVa are distinguished by their low threshold voltage.

The individual compounds of the formulae IA, IB and/or IC and I to XVIII and the sub-formulae thereof which can be used in the media according to the invention are either known or can be prepared analogously to the known compounds.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin® from Ciba, antioxidants, free-radical scavengers, etc. For example, 0-15% of pleochroic dyes or chiral dopants can be added. Suitable stabilisers and dopants are mentioned below in Tables C and D.

C denotes a crystalline phase, S a smectic phase, $S_c$ a smectic C phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2.0 times the value of $V_{10}$. Δn denotes the optical anisotropy. Δε denotes the dielectric anisotropy (Δε=$ε_∥$−$ε_⊥$, where $ε_∥$ denotes the dielectric constant parallel to the longitudinal molecular axes and $ε_⊥$ denotes the dielectric constant perpendicular thereto). The electro-optical data are measured in a TN cell at the 1st minimum (i.e. at a d·Δn value of 0.5 μm) at 20° C., unless expressly stated otherwise. The optical data are measured at 20° C., unless expressly stated otherwise.

In the present application and in the examples below, the structures of the liquid-crystal compounds are indicated by means of acronyms, the trans-formation into chemical formulae taking place in accordance with Tables A and B below. All radicals $C_nH_{2n+1}$ and $C_mH_{2m+1}$ are straight-chain alkyl radicals having n and m C atoms respectively; n and m are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $OC_nH_{2n+1}$ | $C_mH_{2m+1}$ | H | H |
| nO.m | $C_nH_{2n+1}$ | $OC_mH_{2m+1}$ | H | H |

-continued

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nmF | $C_nH_{2n+1}$ | $C_mH_{2m+1}$ | F | H |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are given in Tables A and B.

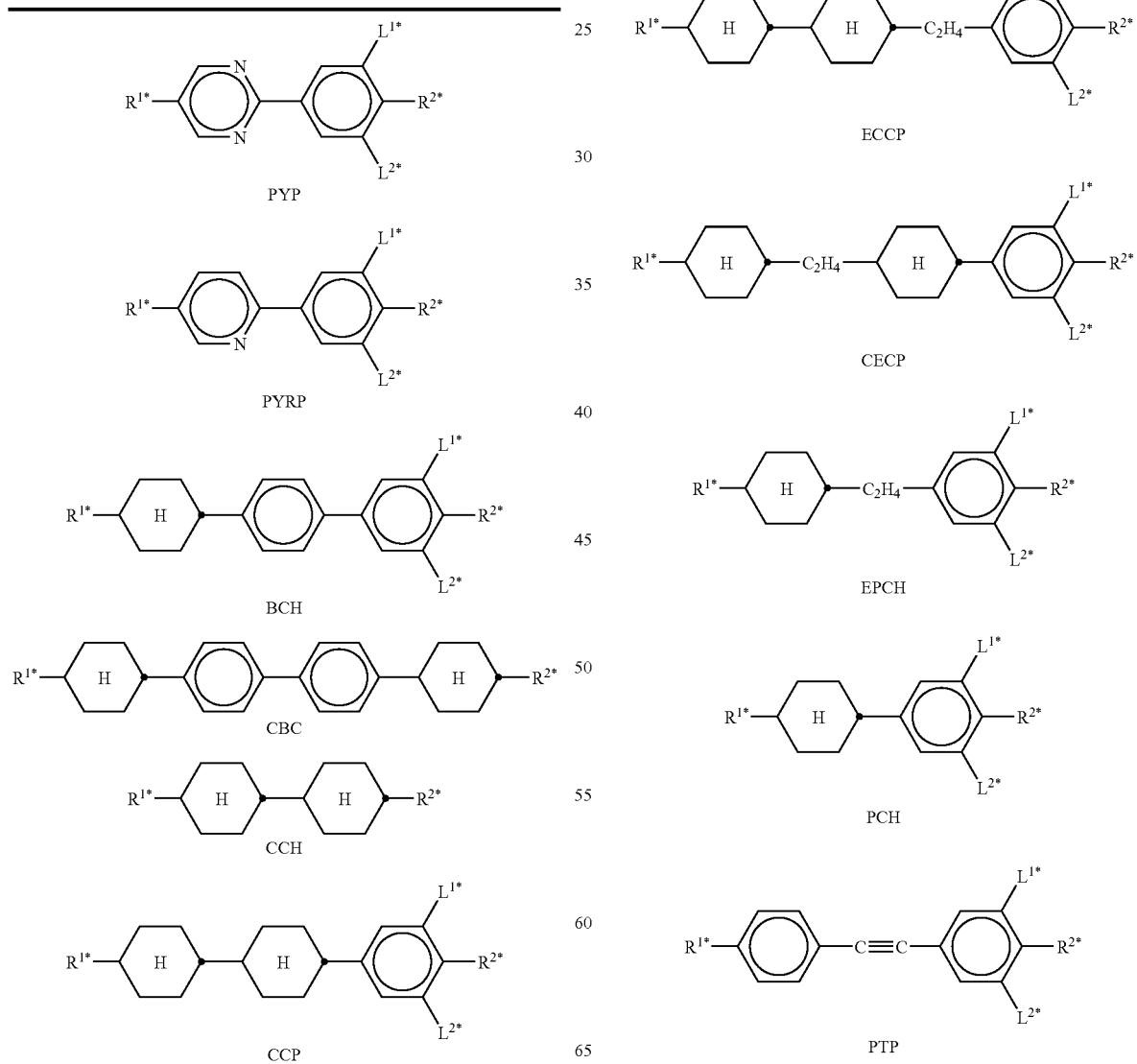

TABLE A-continued
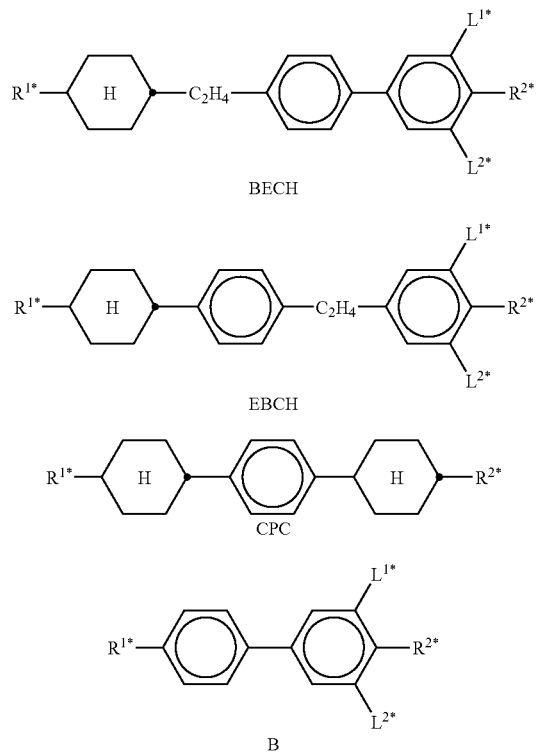
TABLE A-continued
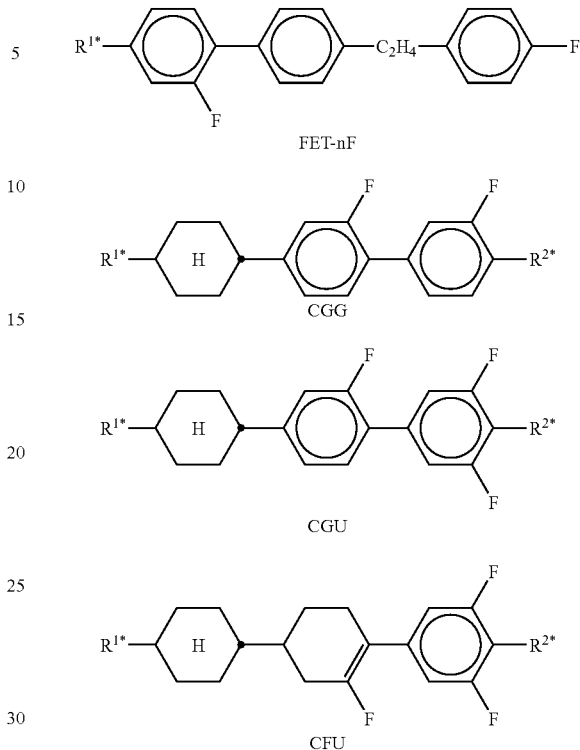
TABLE B
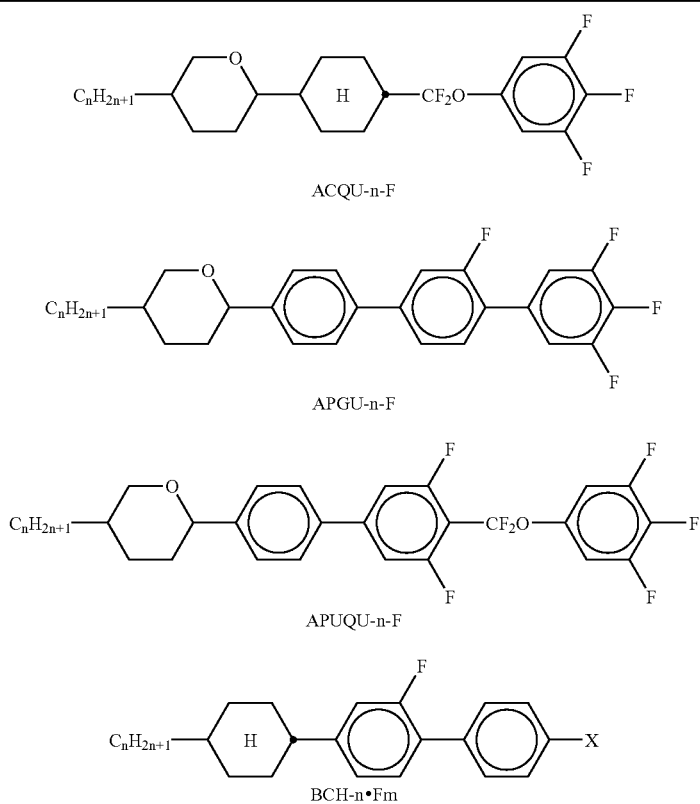

TABLE B-continued
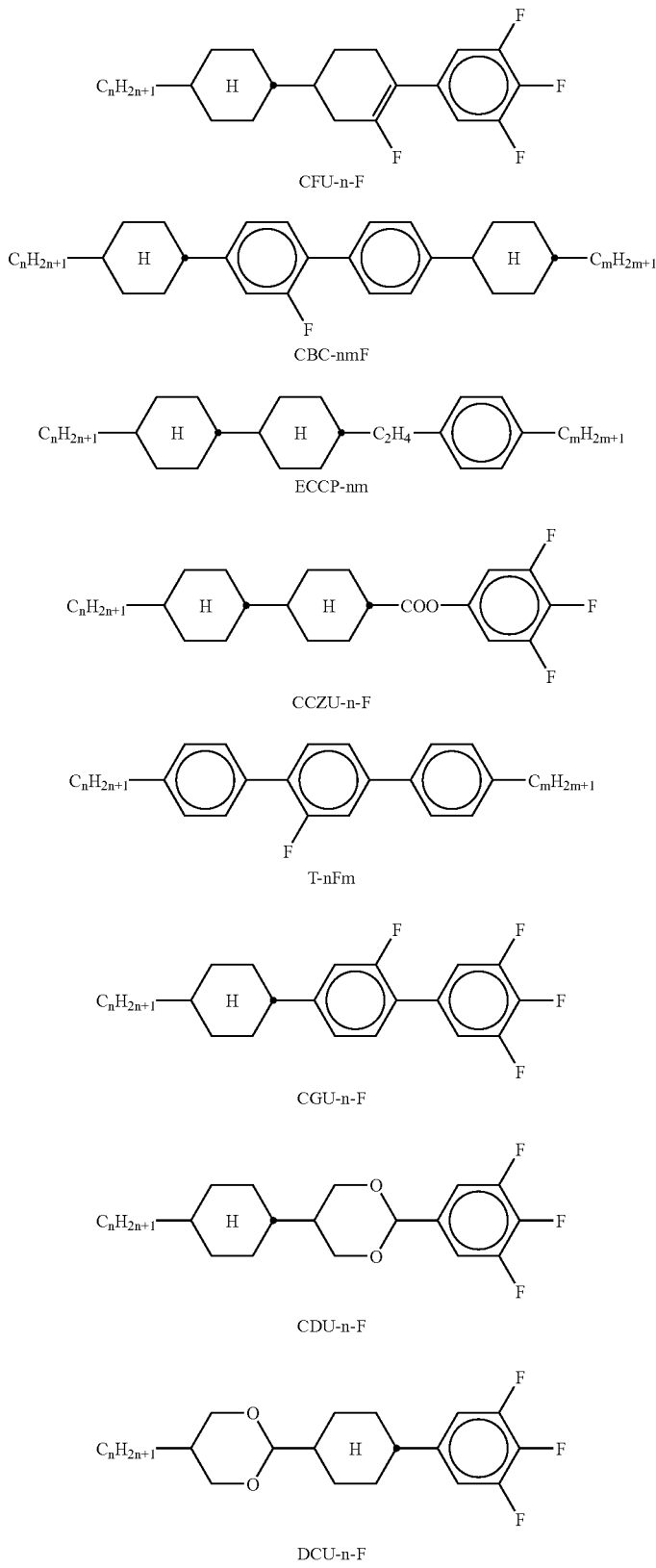

TABLE B-continued
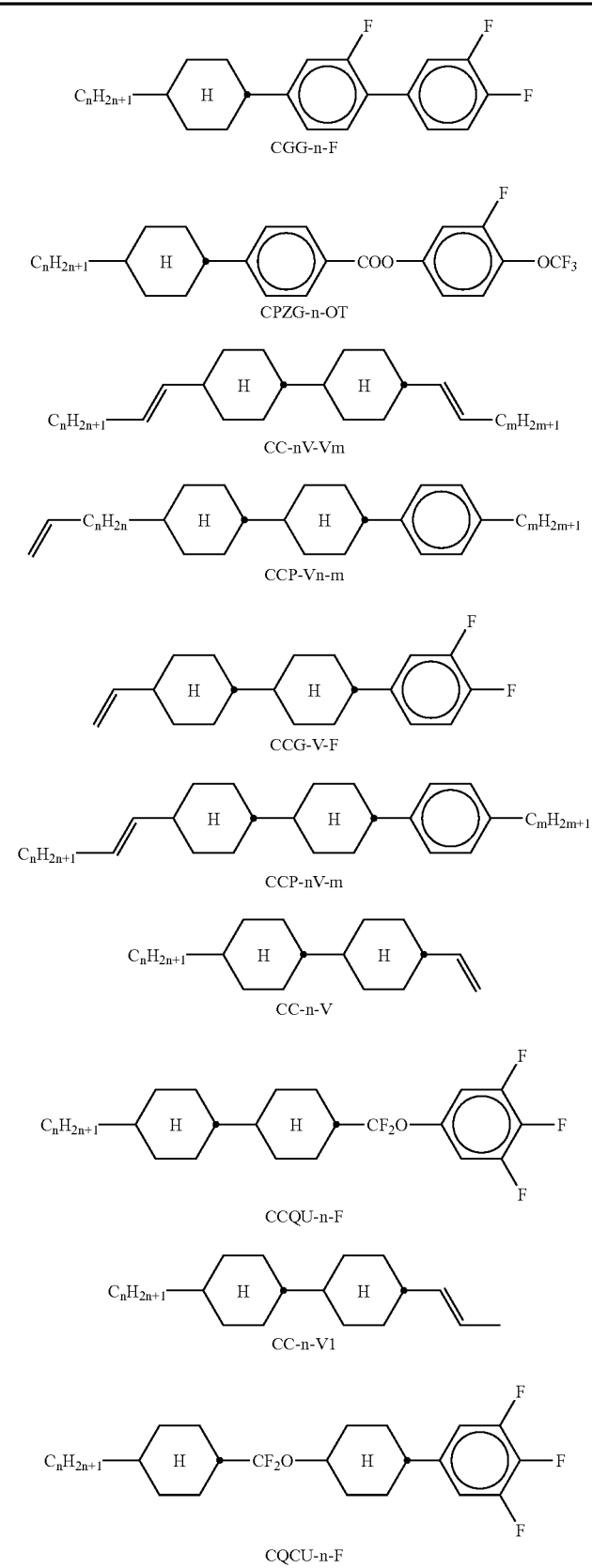

TABLE B-continued
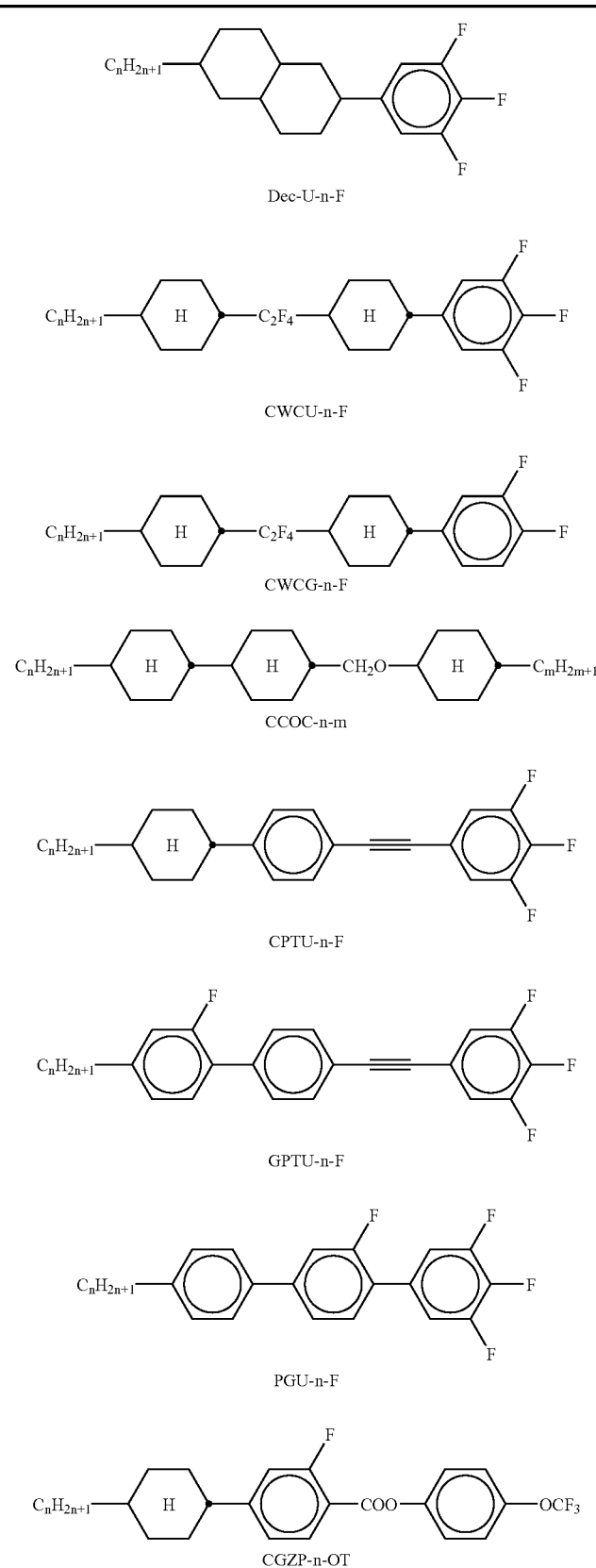

TABLE B-continued
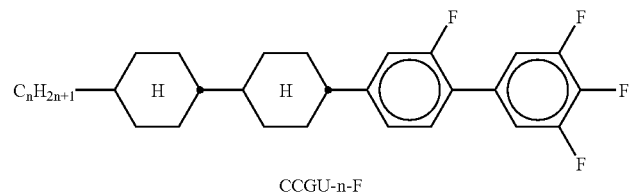
CCGU-n-F
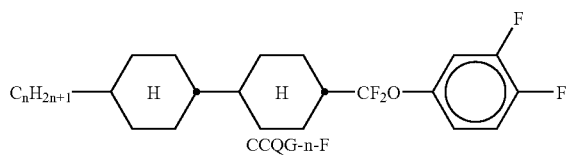
CCQG-n-F
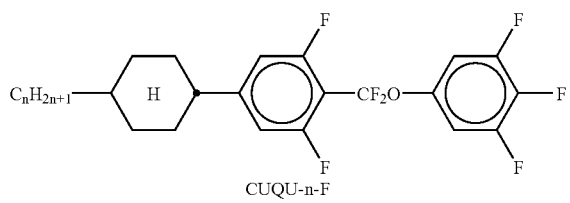
CUQU-n-F
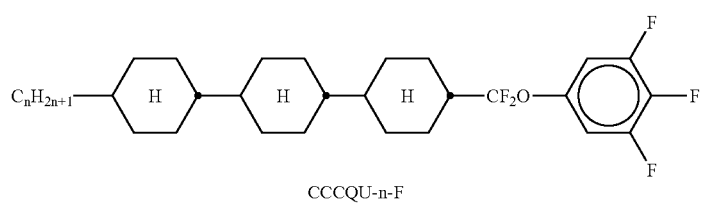
CCCQU-n-F
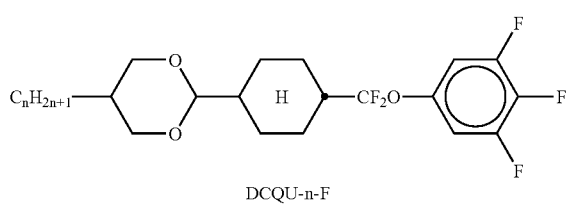
DCQU-n-F
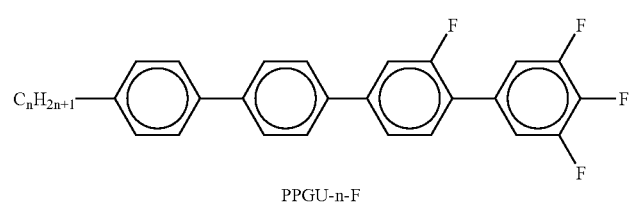
PPGU-n-F
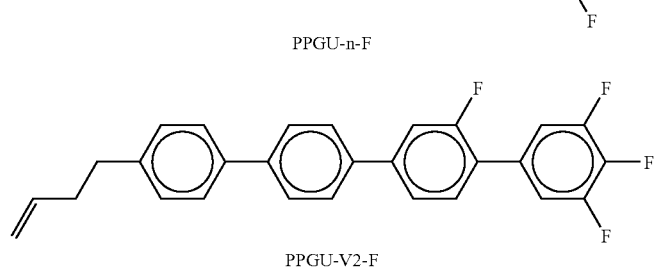
PPGU-V2-F
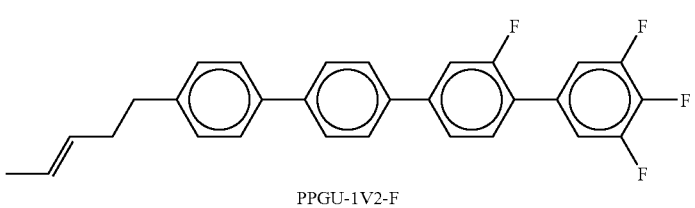
PPGU-1V2-F TABLE B-continued

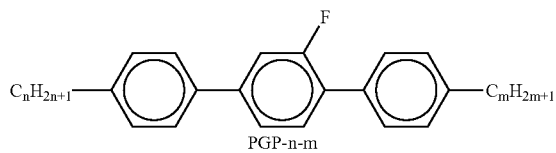
PGP-n-m

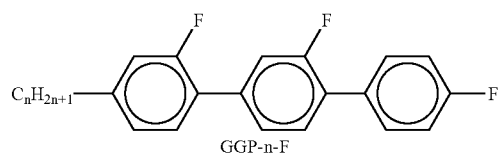
GGP-n-F

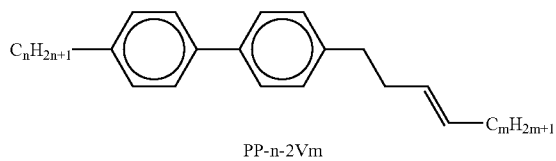
PP-n-2Vm

Particular preference is given to liquid-crystalline mixtures which, besides the compounds of the formulae I, comprise at least one, two, three, four or more compounds from Table B.

TABLE C

Table C shows possible dopants which are generally added to the mixtures according to the invention. The mixtures preferably comprise 0-10% by weight, in particular 0.01-5% by weight and particularly preferably 0.01-3% by weight of dopants.

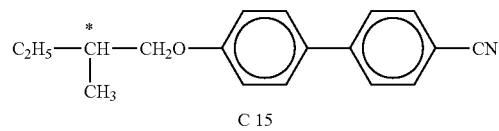
C 15

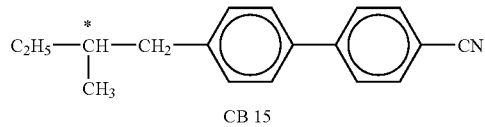
CB 15

CM 21

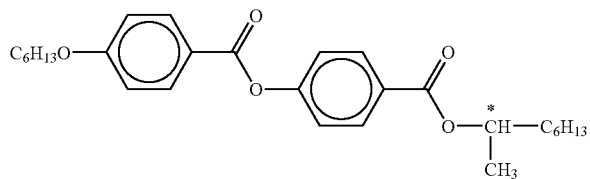
R/S-811

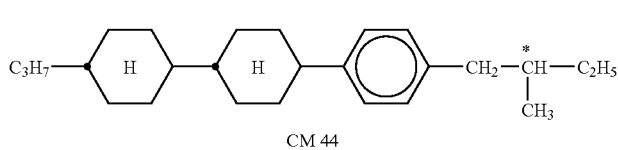
CM 44

TABLE C-continued
Table C shows possible dopants which are generally added to the mixtures according to the invention. The mixtures preferably comprise 0-10% by weight, in particular 0.01-5% by weight and particularly preferably 0.01-3% by weight of dopants.
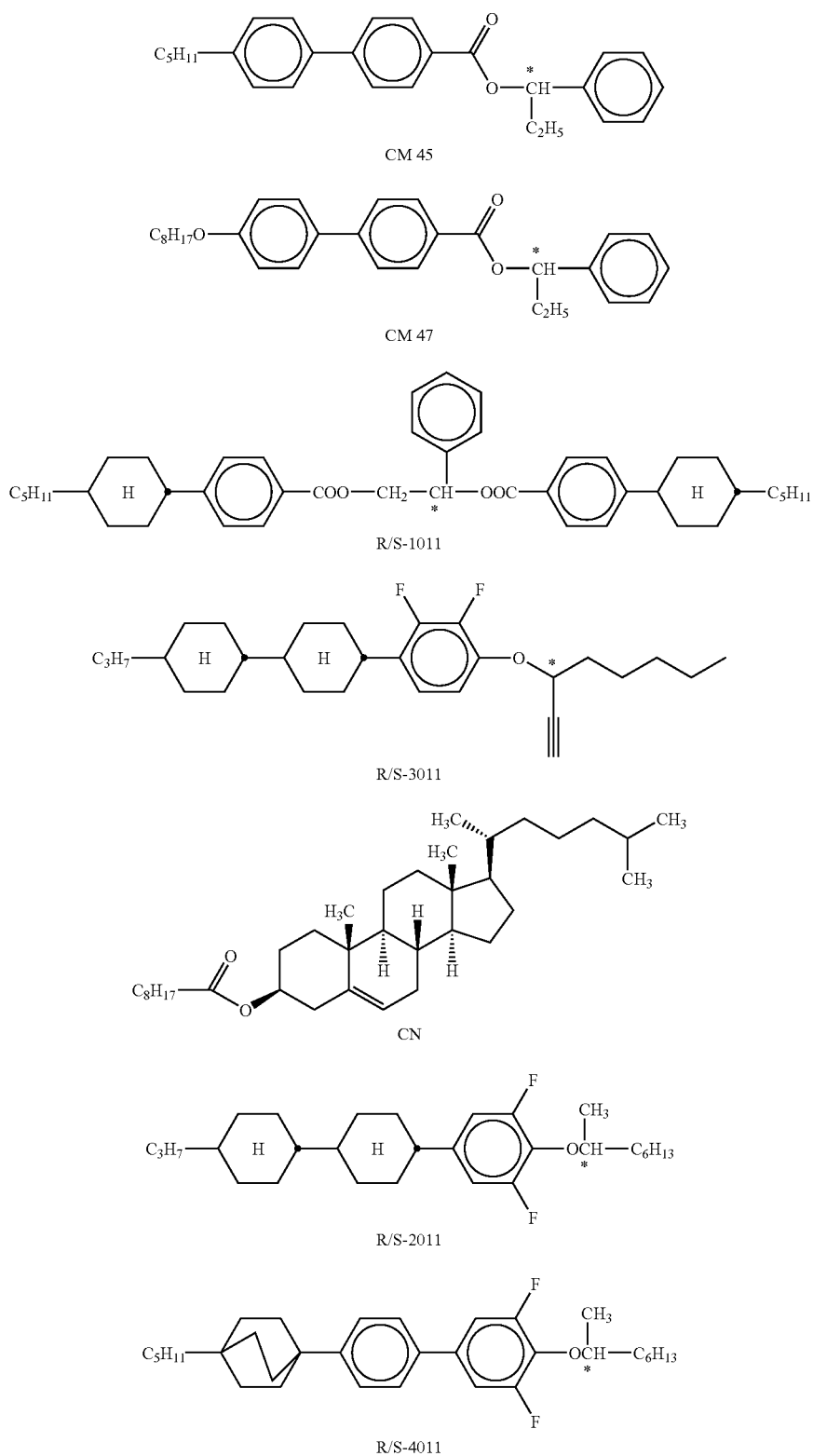

TABLE C-continued

Table C shows possible dopants which are generally added to the mixtures according to the invention. The mixtures preferably comprise 0-10% by weight, in particular 0.01-5% by weight and particularly preferably 0.01-3% by weight of dopants.

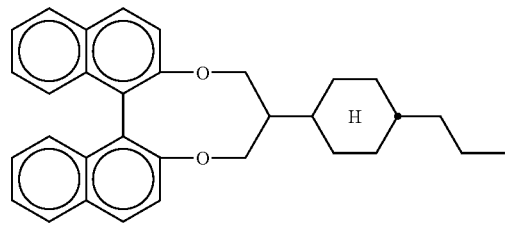

R/S-5011

TABLE D

Stabilisers which can be added, for example, to the mixtures according to the invention in amounts of 0-10% by weight are mentioned below.

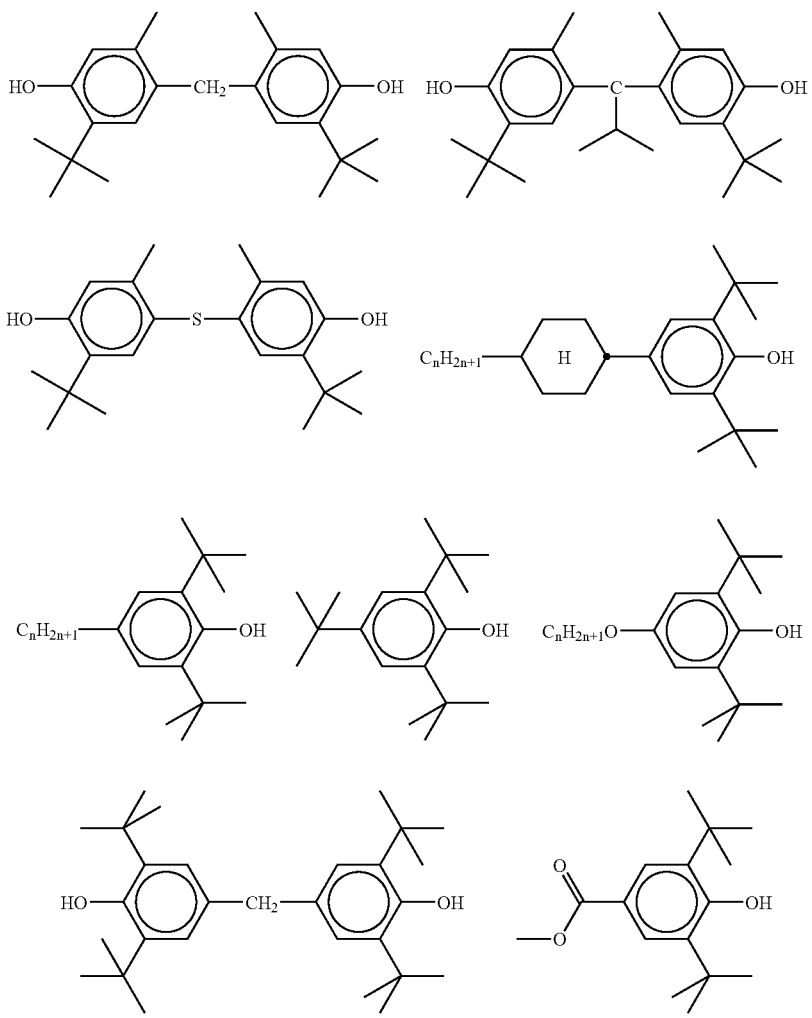

TABLE D-continued
Stabilisers which can be added, for example, to the mixtures according to the invention in amounts of 0-10% by weight are mentioned below.
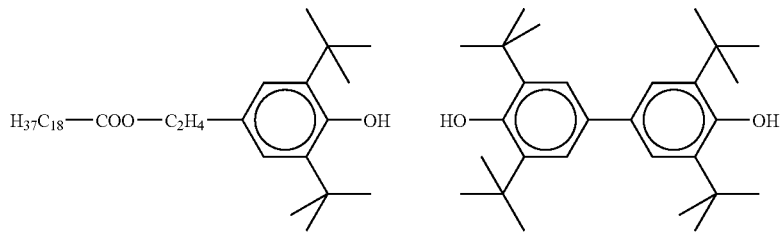
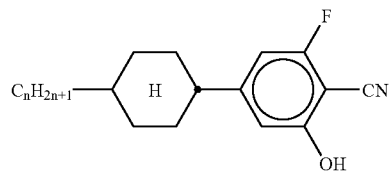
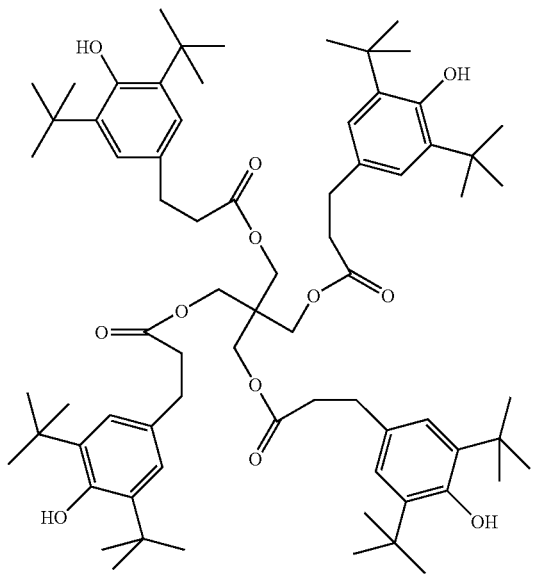
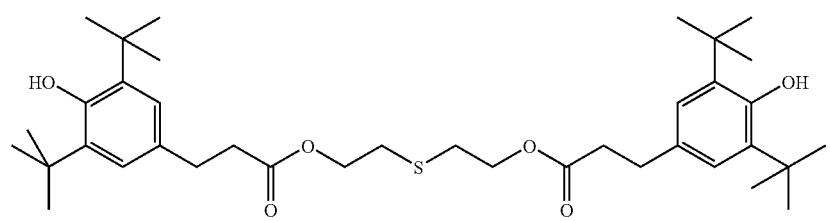

TABLE D-continued
Stabilisers which can be added, for example, to the mixtures according to the invention in amounts of 0-10% by weight are mentioned below.
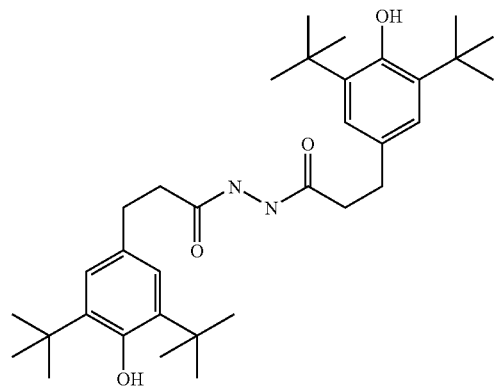
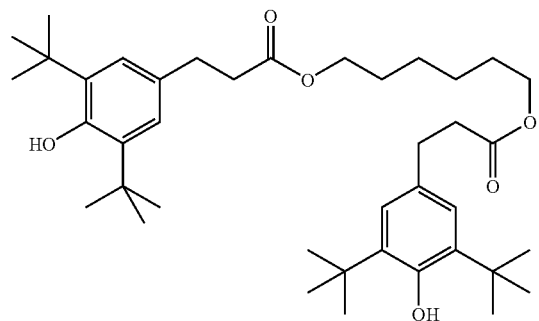
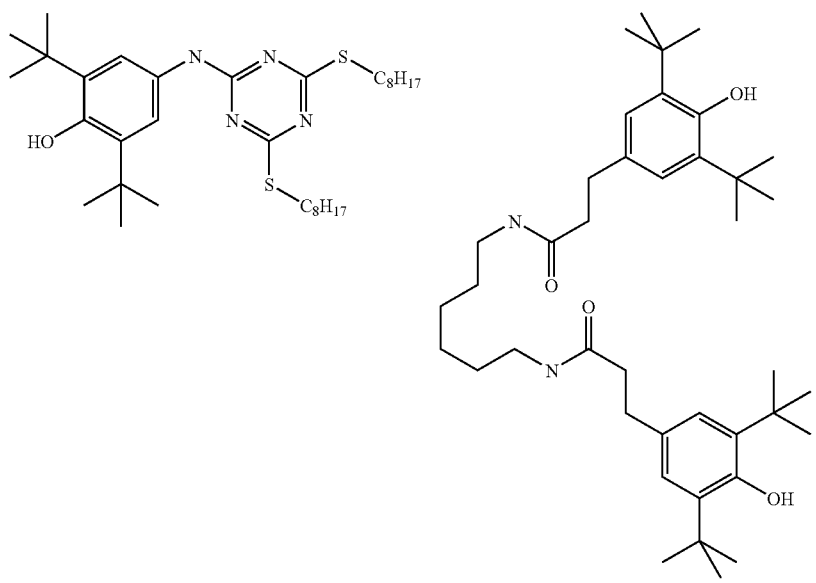

TABLE D-continued
Stabilisers which can be added, for example, to the mixtures according to the invention in amounts of 0-10% by weight are mentioned below.
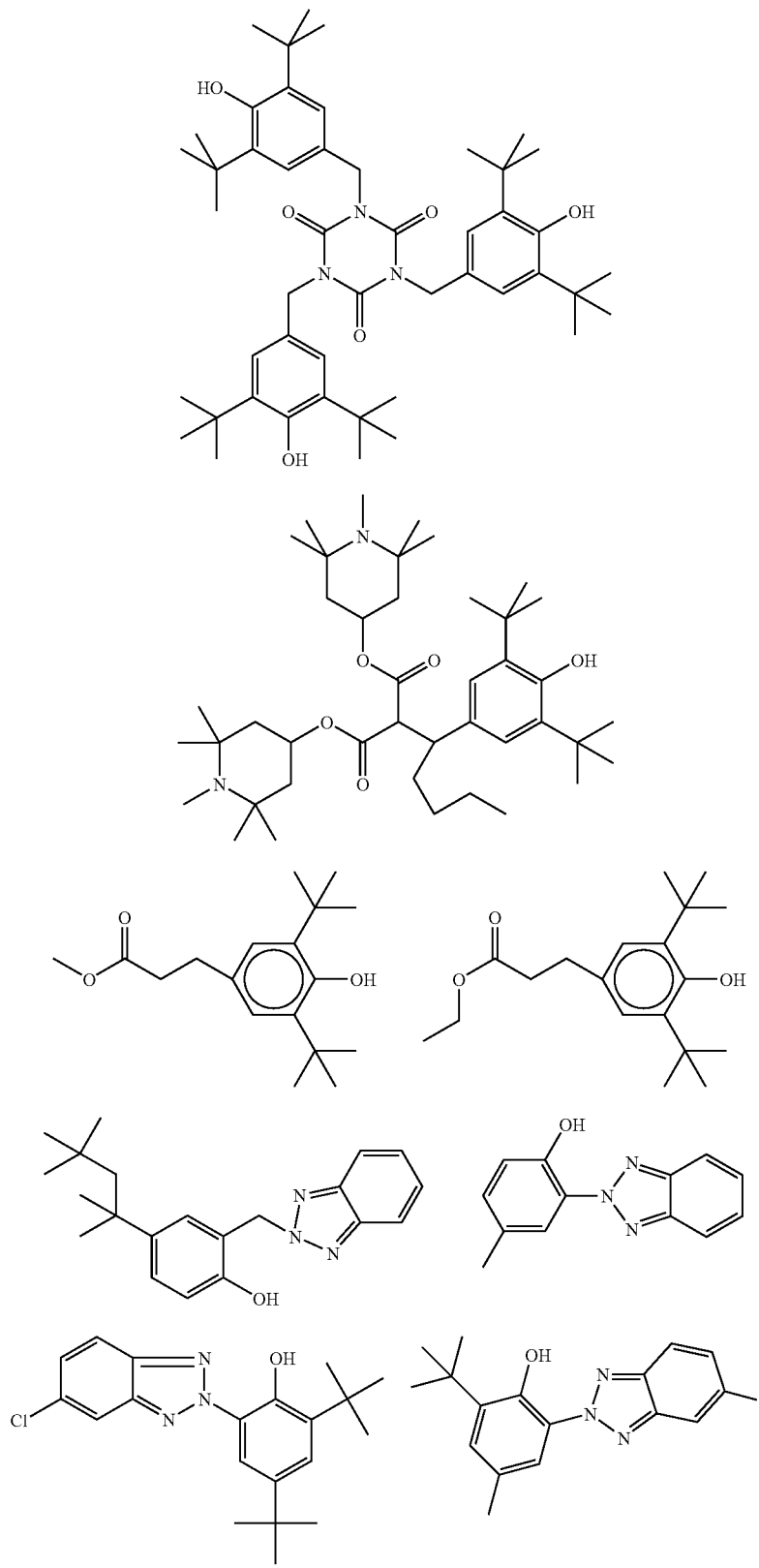

TABLE D-continued
Stabilisers which can be added, for example, to the mixtures according to the invention in amounts of 0-10% by weight are mentioned below.
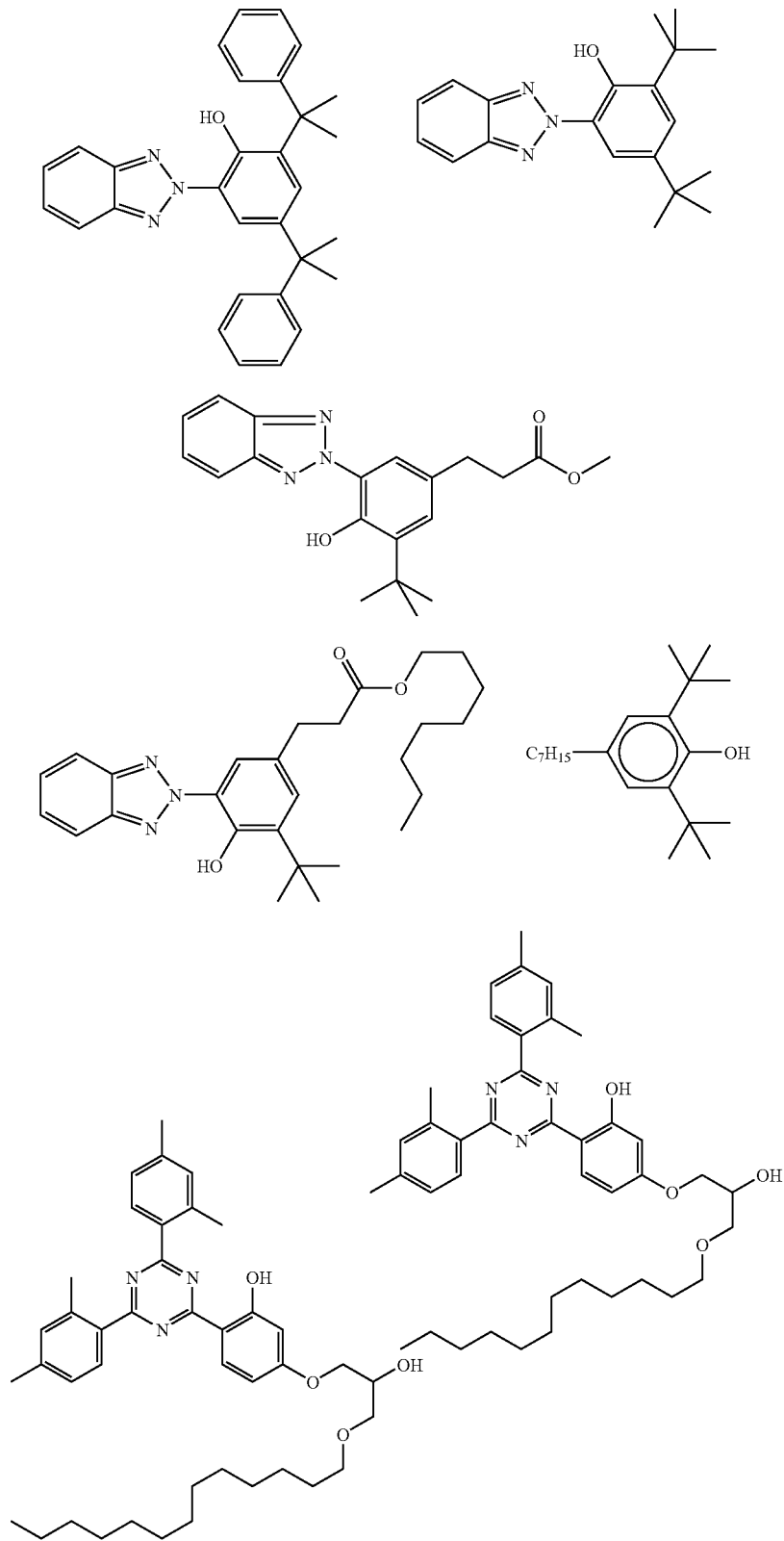

TABLE D-continued

Stabilisers which can be added, for example, to the mixtures according to the invention in amounts of 0-10% by weight are mentioned below.

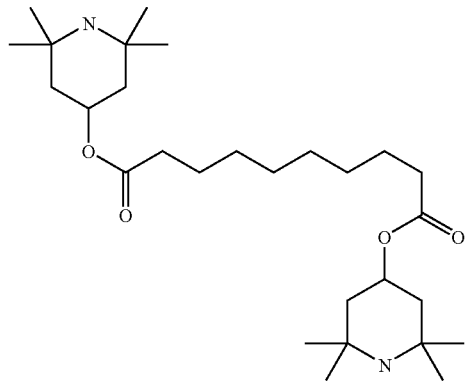

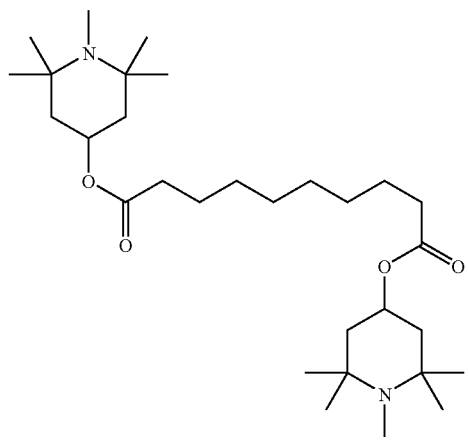

The following examples are intended to explain the invention without restricting it. Above and below, percentages denote percent by weight. All temperatures are indicated in degrees Celsius. m.p. denotes melting point, cl.p. clearing point. Furthermore, C=crystalline state, N=nematic phase, S=smectic phase and I=isotropic phase. The data between these symbols represent the transition temperatures. Δn denotes optical anisotropy (589 nm, 20° C.), the flow viscosity $v_{20}$ (mm²/sec) and the rotational viscosity $\gamma_1$ (mPa·s) are each determined at 20° C.

All concentrations in this application, unless explicitly stated otherwise, are indicated in percent by weight and relate to the corresponding mixture or mixture component. All physical properties are determined in accordance with "Merck Liquid Crystals, Physical Properties of Liquid Crystals" Status November 1997, Merck KGaA, Germany, and apply to a temperature of 20° C., unless explicitly indicated otherwise. Δn is determined at 589 nm and Δε at 1 kHz.

I. MIXTURE EXAMPLES

Example M1

| | | | |
|---|---|---|---|
| CCP-2F.F.F | 8.00% | S→N [° C.]: | <−30.0 |
| CCZU-2-F | 7.00% | Clearing point [° C.]: | 82.0 |
| CCZU-3-F | 9.00% | Δn [589 nm, 20° C.]: | 0.0834 |
| CGZP-2-OT | 4.00% | Δε [1 kHz, 20° C.]: | 9.7 |
| CGZP-3-OT | 4.00% | $\gamma_1$ [mPa · s, 20° C.]: | 94 |
| CDU-2-F | 9.00% | $V_0$ [V]: | 1.29 |
| CDU-3-F | 8.00% | | |
| CDU-5-F | 5.00% | | |
| CC-3-V1 | 10.00% | | |
| CC-4-V | 18.00% | | |
| CCP-V-1 | 11.00% | | |
| PPGU-3-F | 3.00% | | |
| PUQU-3-F | 4.00% | | |

Example M2

| | | | | |
|---|---|---|---|---|
| PGU-2-F | 6.00% | S→N [° C.]: | | <−30.0 |
| PGU-3-F | 6.00% | Clearing point [° C.]: | | 82.0 |
| CC-5-V | 20.00% | Δn [589 nm, 20° C.]: | | 0.1208 |
| CC-3-V1 | 12.00% | Δε [1 kHz, 20° C.]: | | 7.5 |
| PCH-301 | 6.00% | $\gamma_1$ [mPa·s, 20° C.]: | | 81 |
| CCP-V-1 | 11.00% | $V_0$ [V]: | | 1.41 |
| CCP-V2-1 | 10.00% | | | |
| CCG-V-F | 6.00% | | | |
| GGP-5-Cl | 5.00% | | | |
| PUQU-2-F | 7.00% | | | |
| PUQU-3-F | 6.00% | | | |
| PPGU-3-F | 5.00% | | | |

Example M3

| | | | | |
|---|---|---|---|---|
| CCP-20CF$_3$ | 4.00% | S→N [° C.]: | | <−20.0 |
| CCP-30CF$_3$ | 4.00% | Clearing point [° C.]: | | 78.0 |
| PUQU-2-F | 8.00% | Δn [589 nm, 20° C.]: | | 0.1127 |
| PUQU-3-F | 8.00% | Δε [1 kHz, 20° C.]: | | 5.4 |
| CC-3-V1 | 16.00% | $\gamma_1$ [mPa·s, 20° C.]: | | 66 |
| CC-4-V | 12.00% | $V_0$ [V]: | | 1.66 |
| PCH-301 | 12.00% | | | |
| CCP-V-1 | 12.00% | | | |
| CCP-V2-1 | 10.00% | | | |
| PPGU-3-F | 7.00% | | | |
| PP-1-2V1 | 7.00% | | | |

Example M4

| | | | | |
|---|---|---|---|---|
| PGU-2-F | 5.00% | S→N [° C.]: | | <−20.0 |
| PGU-3-F | 6.00% | Clearing point [° C.]: | | 79.0 |
| CC-5-V | 13.00% | Δn [589 nm, 20° C.]: | | 0.1214 |
| CC-3-V1 | 13.00% | | | |
| PCH-301 | 7.00% | | | |
| CCP-V-1 | 12.00% | | | |
| CCP-V2-1 | 10.00% | | | |
| CCG-V-F | 6.00% | | | |
| PUQU-2-F | 7.00% | | | |
| PUQU-3-F | 7.00% | | | |
| PPGU-3-F | 5.00% | | | |
| PP-1-2V1 | 5.00% | | | |
| CCQU-3-F | 4.00% | | | |

Example M5

| | | | | |
|---|---|---|---|---|
| PGU-2-F | 5.00% | S→N [° C.]: | | <−20.0 |
| PGU-3-F | 6.00% | Clearing point [° C.]: | | 79.5 |
| CC-5-V | 17.00% | Δn [589 nm, 20° C.]: | | 0.1199 |
| CC-3-V1 | 13.00% | | | |
| PCH-301 | 7.00% | | | |
| CCP-V-1 | 11.00% | | | |
| CCP-V2-1 | 6.00% | | | |
| CCG-V-F | 6.00% | | | |
| PUQU-2-F | 7.00% | | | |
| PUQU-3-F | 7.00% | | | |
| PPGU-3-F | 5.00% | | | |
| PGP-2-4 | 6.00% | | | |
| CCQU-3-F | 4.00% | | | |

Example M6

| | | | | |
|---|---|---|---|---|
| CCP-20CF$_3$ | 5.00% | Δn [589 nm, 20° C.]: | | 0.1134 |
| CCP-30CF$_3$ | 4.00% | | | |
| PUQU-2-F | 7.00% | | | |
| PUQU-3-F | 7.00% | | | |
| CC-3-V1 | 16.00% | | | |
| CC-4-V | 10.00% | | | |
| PCH-301 | 15.00% | | | |
| CCP-V-1 | 11.00% | | | |
| CCP-V2-1 | 11.00% | | | |
| PPGU-3-F | 4.00% | | | |
| PPGU-5-F | 4.00% | | | |
| PP-1-2V1 | 6.00% | | | |

Example M7

| | | | | |
|---|---|---|---|---|
| CCP-20CF$_3$ | 4.50% | S→N [° C.]: | | <−30.0 |
| CCP-30CF$_3$ | 4.50% | Clearing point [° C.]: | | 77.0 |
| PGU-3-F | 3.00% | Δn [589 nm, 20° C.]: | | 0.1110 |
| PUQU-2-F | 6.00% | Δε [1 kHz, 20° C.]: | | 5.4 |
| PUQU-3-F | 8.00% | $\gamma_1$ [mPa·s, 20° C.]: | | 65 |
| CC-3-V1 | 14.00% | $V_0$ [V]: | | 1.62 |
| CC-4-V | 10.00% | | | |
| PCH-301 | 14.00% | | | |
| CCP-V-1 | 13.00% | | | |
| CCP-V2-1 | 12.00% | | | |
| PPGU-3-F | 5.00% | | | |
| PP-1-2V1 | 6.00% | | | |

II. Measurement of the Voltage HOLDING RATIO with UV EXPOSURE (2 h)

Comparative Example C1

| | | | | |
|---|---|---|---|---|
| GGP-3-Cl | 9.00% | Clearing point [° C.]: | | 82.0 |
| GGP-5-Cl | 26.00% | Δn [589 nm, 20° C.]: | | 0.2100 |
| CC-3-V1 | 6.00% | Δε [1 kHz, 20° C.]: | | 8.6 |
| CC-5-V | 4.00% | $\gamma_1$ [mPa·s, 20° C.]: | | 1.38 |
| PGIGI-3-F | 11.00% | VHR [UV, 2 h]: | | 98% |
| FET-2-Cl | 11.00% | | | |
| FET-3-Cl | 4.50% | | | |
| FET-5-Cl | 9.50% | | | |
| PCH-302 | 5.00% | | | |
| PGU-2-F | 7.00% | | | |
| PGU-3-F | 5.00% | | | |
| CBC-33 | 2.00% | | | |

Example M8

| | | | | |
|---|---|---|---|---|
| GGP-3-Cl | 9.00% | Clearing point [° C.]: | | 85.0 |
| GGP-5-Cl | 26.00% | Δn [589 nm, 20° C.]: | | 0.2166 |
| CC-3-V1 | 6.00% | Δε [1 kHz, 20° C.]: | | 9.9 |
| CC-5-V | 4.00% | $\gamma_1$ [mPa·s, 20° C.]: | | 1.35 |
| PGIGI-3-F | 11.00% | VHR [UV, 2 h]: | | 98.5% |
| FET-2-Cl | 9.00% | | | |
| FET-3-Cl | 2.50% | | | |
| FET-5-Cl | 7.50% | | | |
| PCH-302 | 7.00% | | | |
| PGU-2-F | 7.00% | | | |

-continued

| | |
|---|---|
| PGU-3F | 5.00% |
| PPGU-3-F | 6.00% |

Comparative Example C2

| | | | |
|---|---|---|---|
| GGP-3-Cl | 9.00% | S → N [° C.]: | <−20.0 |
| GGP-5-Cl | 24.00% | Clearing point [° C.]: | 100 |
| PGIGI-3F | 4.00% | Δn [589 nm, 20° C.]: | 0.2001 |
| BCH-3F.F | 4.00% | Δε [1 kHz, 20° C.]: | 12.7 |
| BCH-5F.F | 5.00% | $V_0$ [V]: | 1.15 |
| BCH-3F.F.F | 9.00% | VHR [UV, 2 h]: | 95.8% |
| BCH-5F.F.F | 10.00% | | |
| CBC-33F | 3.00% | | |
| CBC-53F | 4.00% | | |
| CCG-V-F | 6.00% | | |
| PGU-2-F | 6.00% | | |
| PGU-3-F | 7.00% | | |
| FET-2-Cl | 5.00% | | |
| FET-3-Cl | 4.00% | | |

Example M9

Comparative Example C2+1.00% PPGU-3-F VHR1 [UV, 2 h]: 97.7%

Example M10

| | | | |
|---|---|---|---|
| CCP-2OCF$_3$ | 4.00% | S → N [° C.]: | <−30.0 |
| CCP-3OCF$_3$ | 4.00% | Clearing point [° C.]: | +80.0 |
| PGU-3-F | 8.00% | Δn [589 nm, 20° C.]: | +0.1134 |
| PUQU-2-F | 6.00% | Δε [1 kHz, 20° C.]: | +5.1 |
| PUQU-3-F | 6.00% | $\gamma_1$ [mPa·s, 20° C.]: | 68 |
| CC-3-V1 | 14.00% | $V_0$ [V]: | 1.67 |
| CC-4-V | 7.00% | | |
| PCH-301 | 15.00% | | |
| CCP-V-1 | 16.00% | | |
| CCP-V2-1 | 12.00% | | |
| PPGU-3-F | 3.00% | | |
| PP-1-2V1 | 5.00% | | |

Example M11

| | | | |
|---|---|---|---|
| CCP-2OCF$_3$ | 4.00% | S → N [° C.]: | <−30.0 |
| CCP-3OCF$_3$ | 4.00% | Clearing point [° C.]: | +80.0 |
| PGU-2-F | 5.00% | Δn [589 nm, 20° C.]: | +0.1144 |
| PGU-3-F | 4.00% | Δε [1 kHz, 20° C.]: | +5.3 |
| PUQU-2-F | 6.00% | $\gamma_1$ [mPa·s, 20° C.]: | 72 |
| PUQU-3-F | 5.00% | $V_0$ [V]: | 1.66 |
| CC-3-V1 | 14.00% | | |
| CC-4-V | 6.00% | | |
| PCH-301 | 16.00% | | |
| CCP-V-1 | 16.00% | | |
| CCP-V2-1 | 12.00% | | |
| PPGU-3-F | 3.00% | | |
| PP-1-2V1 | 5.00% | | |

Example M12

| | | | |
|---|---|---|---|
| CCP-1F.F.F | 5.00% | S → N [° C.]: | <−30.0 |
| CCP-2F.F.F | 7.00% | Clearing point [° C.]: | +81.5 |
| CCZU-2-F | 6.00% | Δn [589 nm, 20° C.]: | +0.0842 |
| CCZU-3-F | 8.00% | Δε [1 kHz, 20° C.]: | +9.5 |
| CGZP-2-OT | 7.00% | $\gamma_1$ [mPa·s, 20° C.]: | 92 |
| CGZP-3-OT | 8.00% | $V_0$ [V]: | 1.28 |
| CC-3-V1 | 13.00% | | |
| CC-4-V1 | 15.00% | | |
| CCG-V-F | 8.00% | | |
| PPGU-3-F | 3.00% | | |
| CCQU-2-F | 8.00% | | |
| CCQU-3-F | 8.00% | | |
| PUQU-3-F | 4.00% | | |

Example M13

| | | | |
|---|---|---|---|
| PGU-2-F | 9.00% | S → N [° C.]: | <−30.0 |
| PGU-3-F | 9.00% | Clearing point [° C.]: | +81.0 |
| CC-3-V1 | 14.00% | Δn [589 nm, 20° C.]: | +0.1190 |
| CCP-V-1 | 13.00% | Δε [1 kHz, 20° C.]: | +5.3 |
| CCP-V2-1 | 12.00% | $\gamma_1$ [mPa·s, 20° C.]: | 68 |
| CC-4-V | 20.00% | $V_0$ [V]: | 1.66 |
| PCH-3Cl | 15.00% | | |
| PPGU-V2-F | 4.00% | | |
| PPGU-5-F | 4.00% | | |

Example M14

| | | | |
|---|---|---|---|
| PGIGI-3-F | 7.50% | Clearing point [° C.]: | +107.0 |
| BCH-2F.F | 10.00% | Δn [589 nm, 20° C.]: | +0.1803 |
| BCH-3F.F | 10.00% | Δε [1 kHz, 20° C.]: | +13.1 |
| BCH-5F.F | 9.00% | $\gamma_1$ [mPa·s, 20° C.]: | 284 |
| PGU-2-F | 4.00% | $V_0$ [V]: | 1.06 |
| PGU-3-F | 10.00% | | |
| PGU-5-F | 10.00% | | |
| BCH-3F.F.F | 18.00% | | |
| CCGU-3-F | 4.00% | | |
| CBC-33F | 4.00% | | |
| CBC-53F | 4.00% | | |
| CBC-55F | 3.50% | | |
| PPGU-V2-F | 6.00% | | |

Example M15

| | | | |
|---|---|---|---|
| CC-3-V | 29.00% | S → N [° C.]: | <−30.0 |
| CCP-V-1 | 20.00% | Clearing point [° C.]: | +79.0 |
| CCP-3OCF$_3$ | 3.00% | Δn [589 nm, 20° C.]: | +0.1010 |
| CCQU-3-F | 14.00% | Δε [kHz, 20° C.]: | +11.2 |
| PUQU-2-F | 11.00% | $\gamma_1$ [mPa·s, 20° C.]: | 75 |
| PUQU-3-F | 10.00% | | |
| APUQU-2-F | 5.00% | | |
| APUQU-3-F | 5.00% | | |
| PPGU-V2-F | 3.00% | | |

Example M16

| | | | |
|---|---|---|---|
| CC-3-V | 21.50% | S → N [° C.]: | <−40.0 |
| CC-3-V1 | 10.00% | Clearing point [° C.]: | +81.0 |
| CCQU-2-F | 9.00% | Δn [589 nm, 20° C.]: | +0.1010 |
| CCQU-3-F | 15.00% | Δε [kHz, 20° C.]: | +13.7 |
| PUQU-3-F | 16.00% | γ₁ [mPa·s, 20° C.]: | 90 |
| CCP-30CF₃ | 8.00% | | |
| APUQU-2-F | 7.00% | | |
| APUQU-3-F | 7.00% | | |
| PPGU-V2-F | 4.00% | | |
| CBC-33 | 2.50% | | |

Example M17

| | |
|---|---|
| PUQU-3-F | 13.00% |
| CC-3-V | 46.00% |
| CCGU-3-F | 10.00% |
| PGU-3-F | 10.00% |
| BCH-32 | 9.00% |
| PPGU-V2-F | 4.00% |
| PGP-2-4 | 4.00% |
| PGP-2-3 | 4.00% |

Beispiel M18

| | | | |
|---|---|---|---|
| PUQU-3-F | 13.00% | Δε [1 kHz, 20° C.]: | +7.1 |
| CC-3-V | 45.00% | | |
| CCGU-3-F | 10.00% | | |
| PGU-3-F | 10.50% | | |
| BCH-32 | 9.50% | | |
| PPGU-V2-F | 3.00% | | |
| PGP-2-4 | 5.00% | | |
| PGP-2-3 | 4.00% | | |

The invention claimed is:

1. A liquid-crystalline medium based on a mixture of polar compounds, said medium one or more compounds of formula I

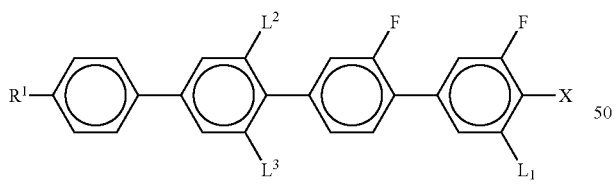

and
one or more compounds selected from the compounds of formulae IA, IB and IC

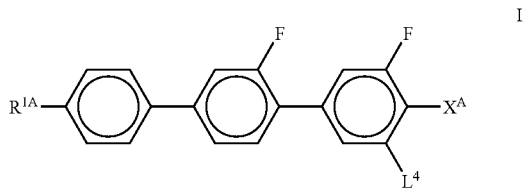

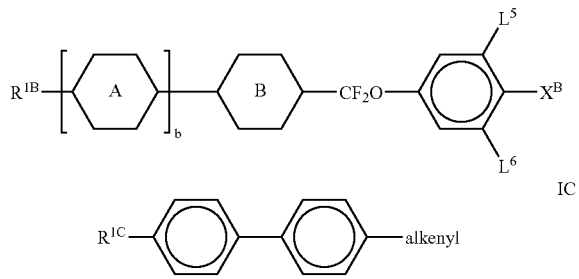

in which
R¹, R^{1A}, R^{1C} and R^{1C} are each, independently of one another, a halogenated or unsubstituted alkyl or alkoxy radical having 1 to 15 C atoms, where, in addition, one or more CH² groups are each optionally replaced, independently of one another, by —C≡C—, —CF₂—O—, —OCF₂—,
—CH=CH—, 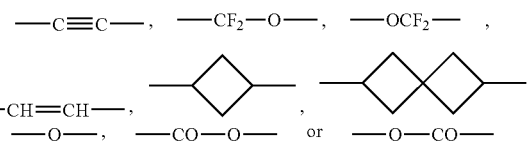
—O—, —CO—O— or —O—CO— in such a way that O atoms are not linked directly to one another,

X, X^A, and X^B are each, independently of one another, F, Cl, CN, SF₅, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms,

a) are each independently of one another, a 1,4-cyclohexenylene or 1,4-cyclohexylene radical, in which one or two non-adjacent CH₂ groups are each optionally replaced by —O— or —S—,
c) a 1,4-phenylene radical, in which one or two CH groups are each optionally replaced by N,
b) piperidine-1,4-diyl, 1,4-bicyclo[2.2.2]octylene, a naphthalene-2,6-diyl, decahydronaphthalene-2,6-diyl, 1,2,3,4-tetrahydronaphthalene-2,6-diyl, phenanthrene-2,7-diyl, or fluorene-2,7-diyl,
where the radicals a), b) and c) are each optionally mono- or polysubstituted by halogen atoms,
"alkenyl" is a straight-chain alkenyl having 2 to 9 C atoms,
L¹ is F,
L² and L³ are each H,
L⁴ to L⁶ are each, independently of one another, H or F, and
b is 0, 1 or 2.

2. A liquid-crystalline medium according to claim 1, wherein said medium comprises one, two or more compounds of formulae I-1 to I-10

I-1 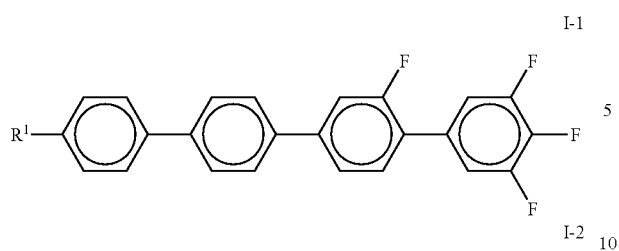
I-2 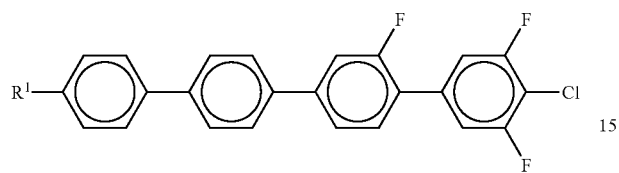
I-3 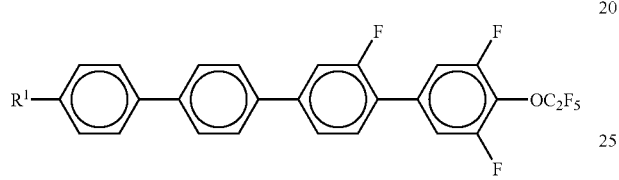
I-4 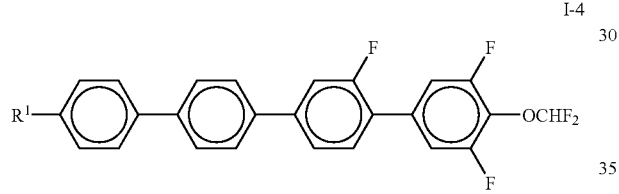
I-5 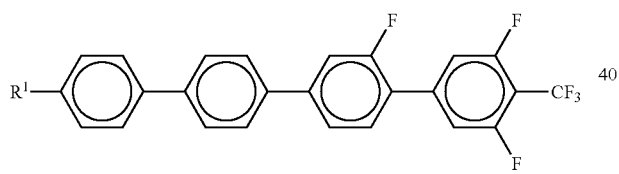
I-6 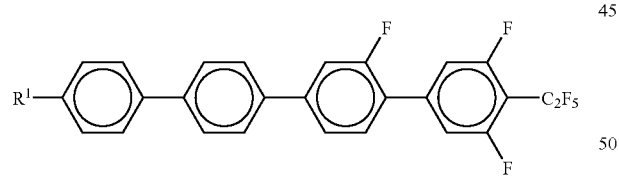
I-7 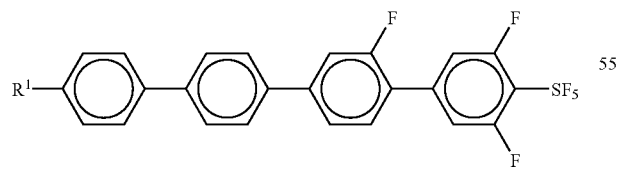
I-8 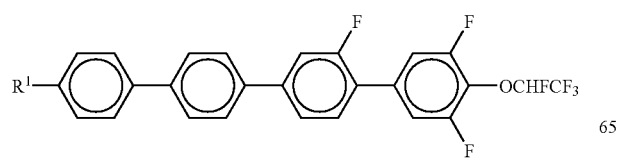
-continued
I-9
I-10
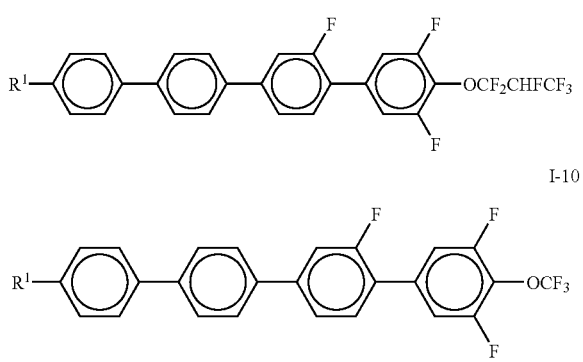
3. A liquid-crystalline medium according to claim 1, wherein said medium comprises one or more compounds of the formulae IA-1 to IA-12
IA-1 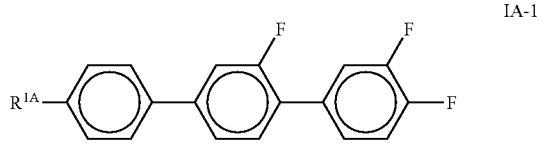
IA-2 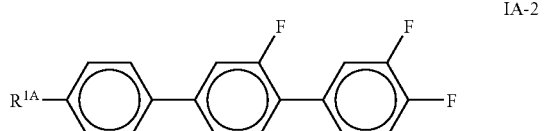
IA-3 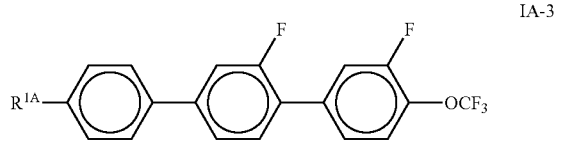
IA-4 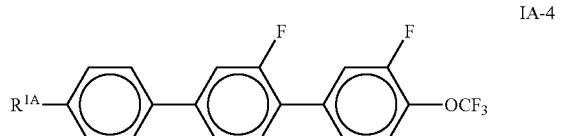
IA-5 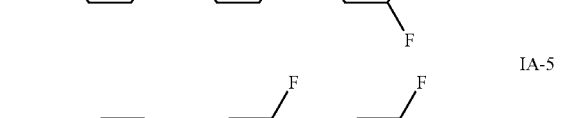
IA-6 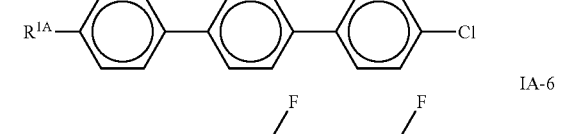
IA-7 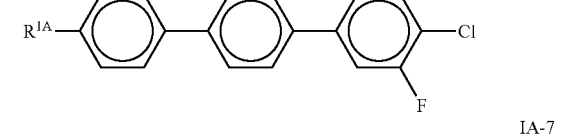

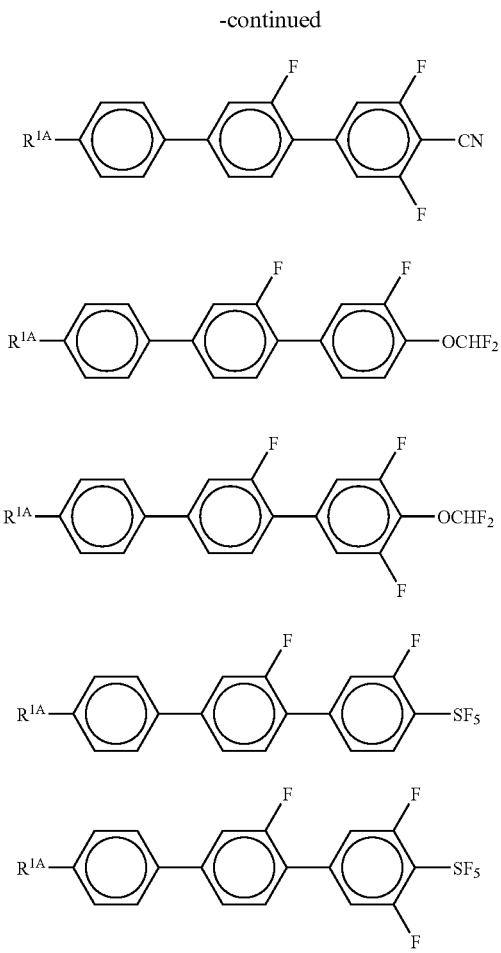
4. A liquid-crystalline medium according to claim 1, wherein said medium comprises one or more compounds of formulae IB-1 to IB-29
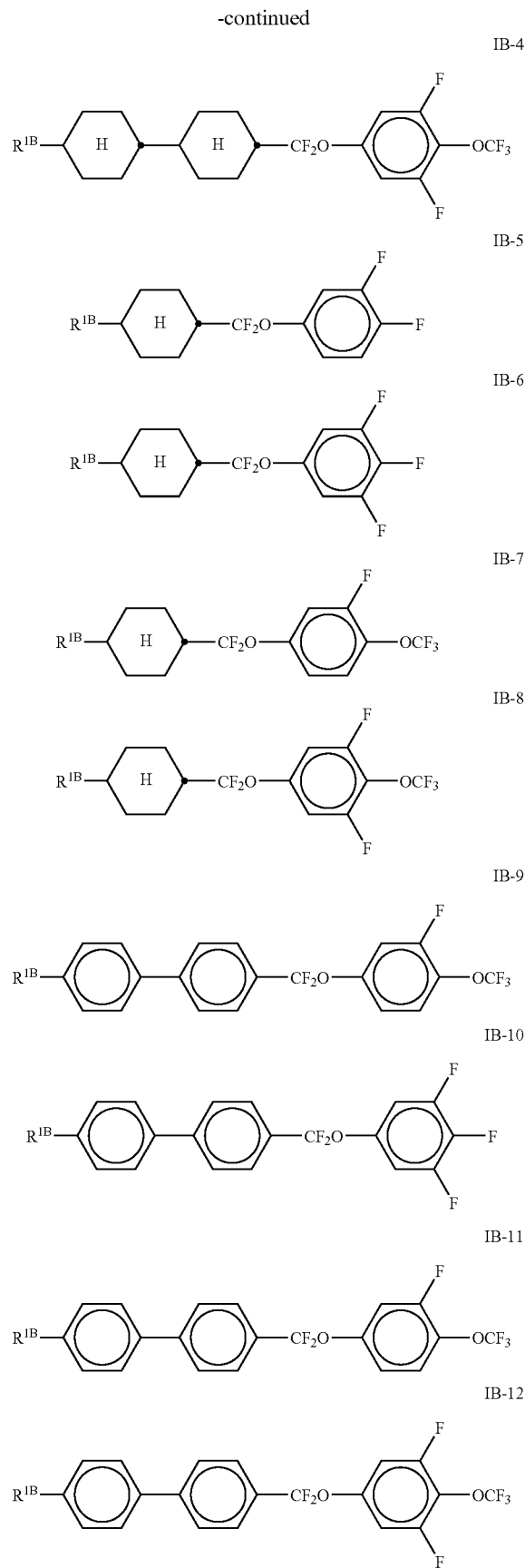

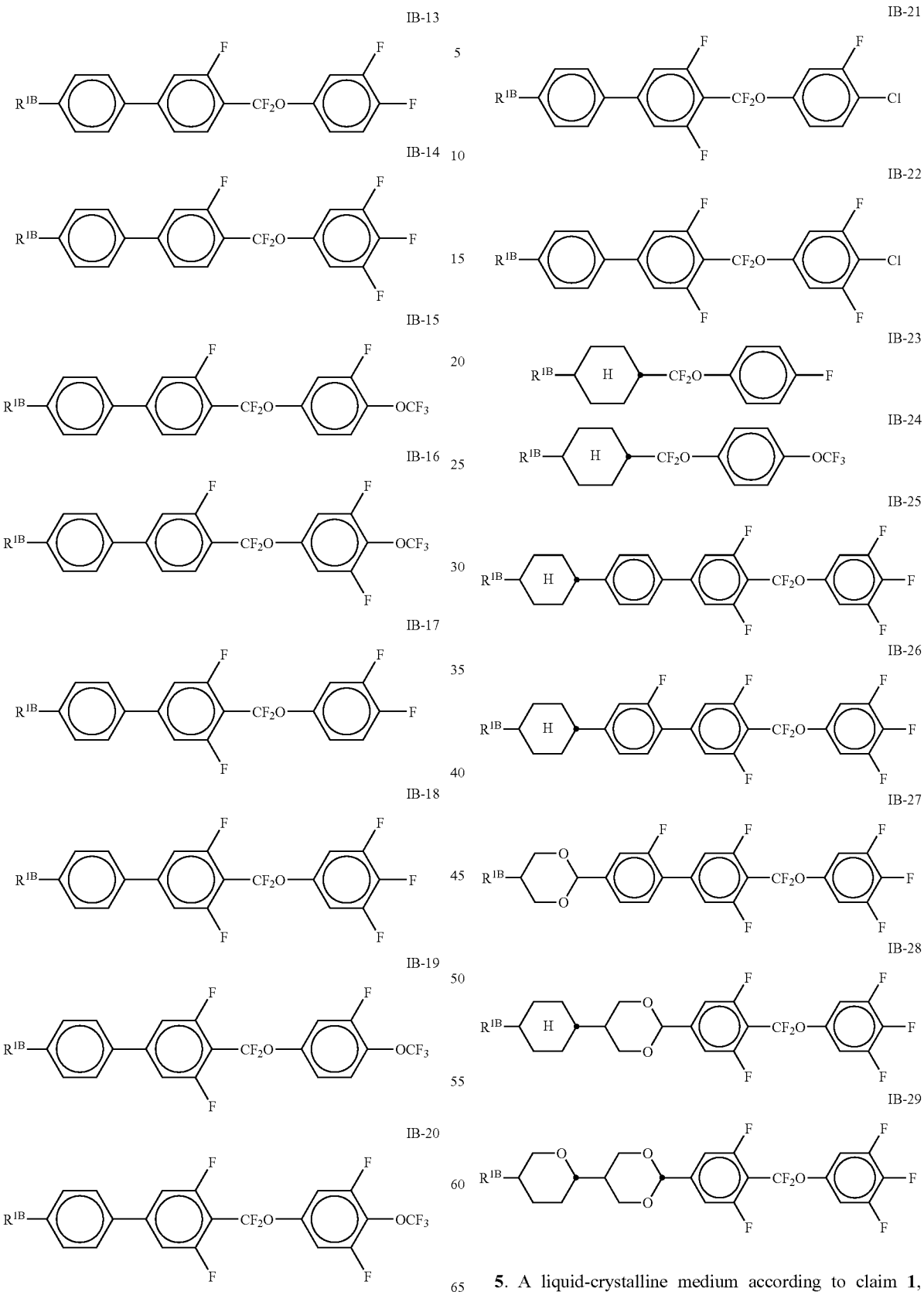
5. A liquid-crystalline medium according to claim 1, wherein said medium comprises one or more compounds of the formulae IC-1 and IC-2

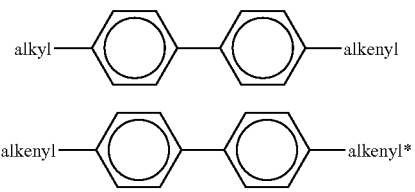

in which
alkyl is a straight-chain alkyl having 1-9 C atoms,
alkenyl and alkenyl* are each, independently of one another, straight-chain alkenyl having 2 to 9 C atoms.

6. A liquid-crystalline medium according to claim 1, wherein said medium further comprises one or more compounds selected from the general formulae II to VI

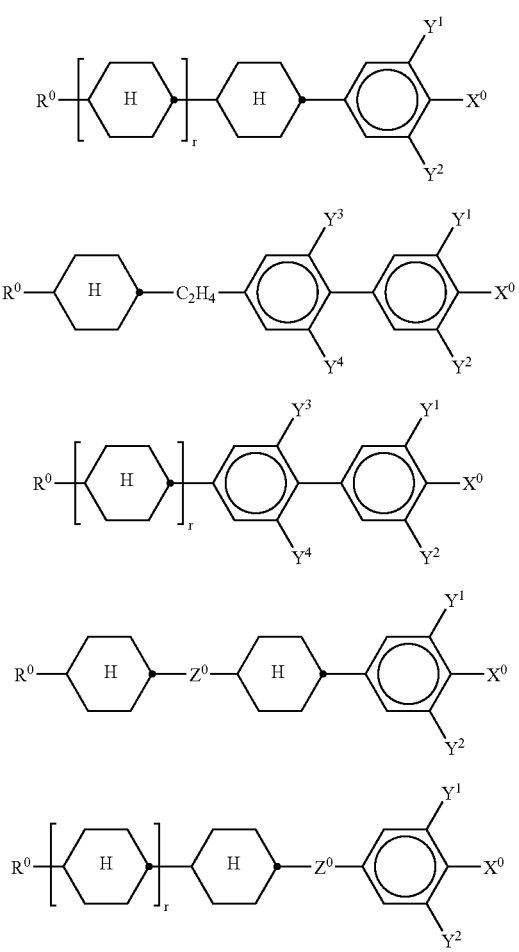

in which
R$^0$ is n-alkyl having up to 9 C atoms, alkoxy having up to 9 C atoms, oxaalkyl having up to 9 C atoms, fluoroalkyl having up to 9 C atoms, or alkenyl having up to 9 C atoms,
X$^0$ is F, Cl, halogenated alkyl having up to 6 C atoms, halogenated alkenyl having up to 6 C atoms, halogenated oxaalkyl having up to 6 C atoms, halogenated alkenyloxy having up to 6 C atoms, or halogenated alkoxy having up to 6 C atoms,
Z$^0$ is —C$_2$F$_4$—, —CF=CF—, —CH=CH—, —C$_2$H$_4$—, —(CH$_2$)$_4$—, —OCH$_2$—, —CH$_2$O—, —CF$_2$O—, or —OCH$_2$—,
Y$^1$ to Y$^4$ are each, independently of one another, H or F, and
r is 0 or 1.

7. A liquid-crystalline medium according to claim 1, further comprising one or more compounds of formulae E-a to E-c

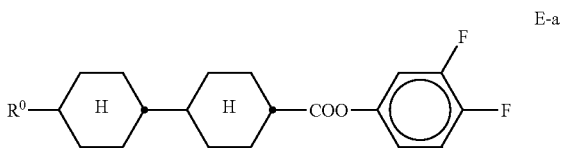

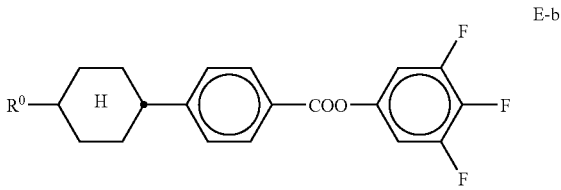

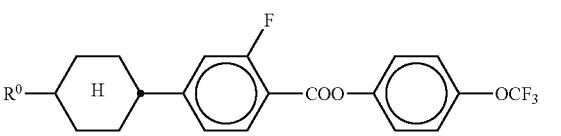

in which R$^0$ is n-alkyl having up to 9 C atoms, alkoxy having up to 9 C atoms, oxaalkyl having up to 9 C atoms, fluoroalkyl having up to 9 C atoms, or alkenyl having up to 9 C atoms.

8. A liquid-crystalline medium according to claim 6, wherein said medium comprises one or more compounds of formulae IIa to IIg

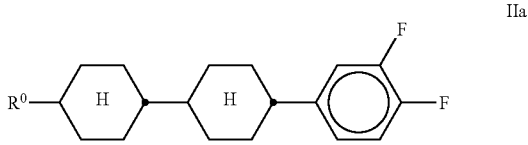

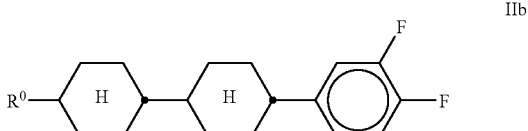

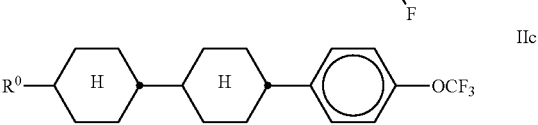

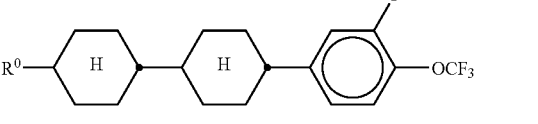

-continued

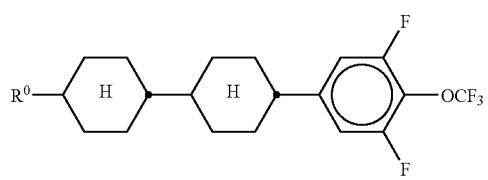
IIe

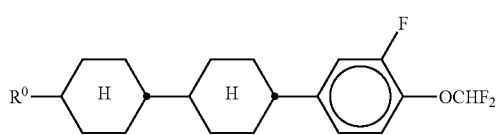
IIf

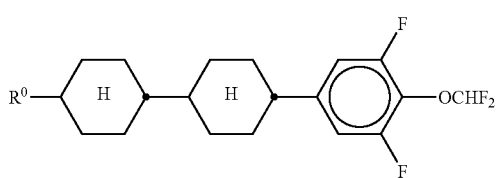
IIg in which $R^0$ is n-alkyl having up to 9 C atoms, alkoxy having up to 9 C atoms, oxaalkyl having up to 9 C atoms, fluoroalkyl having up to 9 C atoms, or alkenyl having up to 9 C atoms.

9. A liquid-crystalline crystalline medium according to claim 1, further comprising one or more dioxane compounds of the formulae D1 to D4

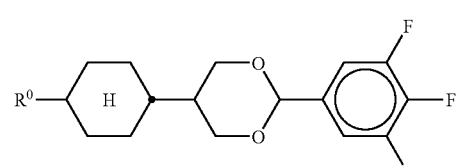
D-1

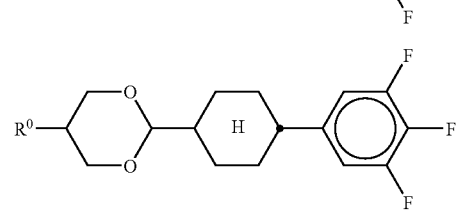
D-2

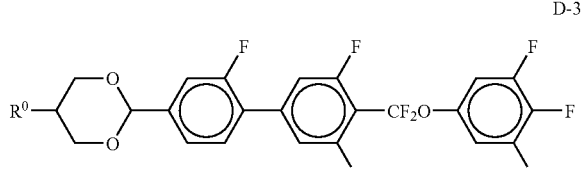
D-3

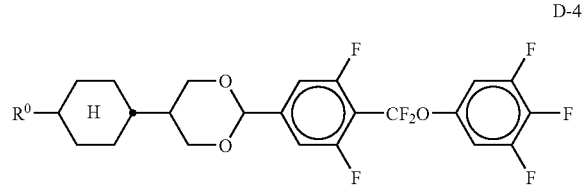
D-4 in which $R^0$ is n-alkyl having up to 9 C atoms, alkoxy having up to 9 C atoms, oxaalkyl having up to 9 C atoms, fluoroalkyl having up to 9 C atoms, or alkenyl having up to 9 C atoms.

10. A liquid-crystalline medium according to claim 1, wherein the proportion of compounds of formula I in the mixture as a whole is 0.01 to 30% by weight.

11. An electro-optical liquid-crystal display containing a liquid-crystalline medium according to claim 1.

12. A method of generating an electro-optical effect comprising applying a voltage to a display according to claim 11.

13. A liquid-crystalline medium according to claim 1, wherein the optical anisotropy Δn of said medium is ≧0.07.

14. A liquid-crystalline medium according to claim 1, wherein the optical anisotropy Δn of said medium is ≧0.08.

15. A liquid-crystalline medium according to claim 1, wherein said medium has a nematic phase down to −30° C.

16. A liquid-crystalline medium according to claim 1, wherein said medium has a clearing point above 70° C.

17. A liquid-crystalline medium according to claim 1, wherein said medium has a dielectric anisotropy value of Δε of ≧5.

18. A liquid-crystalline medium according to claim 1, wherein said medium has a TN threshold voltage below 2.0 V.

19. A liquid-crystalline medium according to claim 1, wherein said medium has a flow viscosity $V_{20}$ at 20° C. of 50 mm$^2$·s$^{-1}$.

20. A liquid-crystalline medium according to claim 1, wherein said medium has a rotational viscosity $\gamma_1$ at 20° C. of <100 mPa·s.

21. A liquid-crystalline medium according to claim 2, wherein $R^1$ in sub-formulae I-1 to I-10 is $CH_3$, $C_2H_5$, $n$-$C_3H_7$, n-$C_4H_9$, n-$C_5H_{11}$, n-$C_6H_{13}$, n-$C_7H_{15}$, $CH_2$=CH, $CH_3CH$=CH, $CH_2$=$CHCH_2CH_2$ or $CH_3CH$=$CHCH_2CH_2$.

22. A liquid-crystalline medium according to claim 3, wherein $R^{1A}$ is straight chain alkyl having 1 to 15 C atoms, vinyl, 1E-alkenyl, or 3E-alkenyl 23. A liquid-crystalline medium according to claim 3, wherein said medium comprises one or more compounds of formulae IA-1 to IA-2.

24. A liquid-crystalline medium according to claim 4, wherein $R^{1B}$ is straight chain alkyl having 1 to 15 C atoms, vinyl, 1E-alkenyl, or 3E-alkenyl.

25. A liquid-crystalline medium according to claim 4, wherein said medium comprises one or more compounds of formulae IB-1, IB-2, IB-5, IB-6, IB-17, IB-18 and IB-29.

26. A liquid-crystalline medium according to claim 1, wherein the concentration of compounds of formula IA in the medium is 2-50% by weight.

27. A liquid-crystalline medium according to claim 1, wherein the concentration of compounds of formula IB in the medium is 2-50% by weight.

28. A liquid-crystalline medium according to claim 1, wherein the concentration of compounds of formula IC in the medium is 2-50% by weight.

29. A liquid-crystalline medium according to claim 2, wherein the concentration of compounds of formula I in the medium is 0.01 to 30% by weight.

30. A liquid-crystalline medium according to claim 29, wherein the concentration of compounds of formula IA in the medium is 2-50% by weight; the concentration of compounds of formula IB in the medium is 2-50% by weight; and the concentration of compounds of formula IC in the medium is 2-50% by weight.

31. A liquid-crystalline medium according to claim 6, wherein the proportion of compounds of formulae II to VI in the medium is 10 to 80% by weight.

32. A liquid-crystalline medium according to claim 1, wherein the proportion of compounds of the formula I and formulae IA, IB and/or IC in the mixture as a whole is at least 10% by weight.

33. A liquid-crystalline medium based on a mixture of polar compounds, said medium comprising one or more compounds of formula I

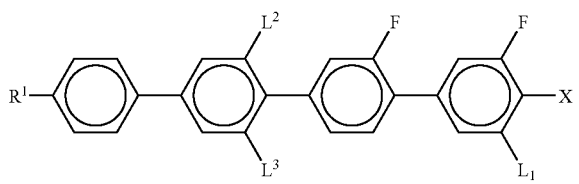

I and one or more compounds selected from of the formulae IC-1 and IC-2

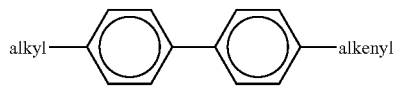

IC-1

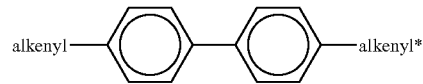

IC-2 in which

R¹ is halogenated or unsubstituted alkyl or alkoxy radical having 1 to 15 C atoms, where, in addition, one or more CH₂ groups are each optionally replaced by -C≡C-, -CF₂-O-, -OCF₂-, -CH=CH-,

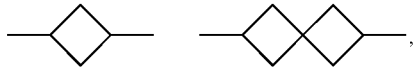

-O-, -CO-O or -O-CO- in such a way that O atoms are not linked directly to one another, X is F, Cl, CN, SF₅, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms, L¹ to L³ are each, independently of one another, H or F, alkyl is a straight-chain alkyl having 1-9 C atoms, and alkenyl and alkenyl* are each, independently of one another, straight-chain alkenyl having 2 to 9 C atoms.

* * * * *

UNITED STATES PATENT AND TRADEMARK OFFICE
CERTIFICATE OF CORRECTION

PATENT NO. : 7,635,505 B2  Page 1 of 1
APPLICATION NO. : 11/629626
DATED : December 22, 2009
INVENTOR(S) : Atsutaka Manabe It is certified that error appears in the above-identified patent and that said Letters Patent is hereby corrected as shown below:

Column 67, line 41 reads: "compounds, said medium one or more compounds of formula"
Should read: --compounds, said medium comprising one or more compounds of formula--

Column 68, line 18 reads: "$R^{1A}$, $R^{1C}$ and $R^{1C}$ are each, independently of one"
Should read: -- $R^{1A}$, $R^{1B}$ and $R^{1C}$ are each, independently of one--

Column 68, line 21 reads: "more $CH^2$ groups are each optionally replaced, indepen-"
Should read: -- more $CH_2$ groups are each optionally replaced, indepen- --

Column 68, line 28 reads: "-O-, -CO-O- or -O-CO-"
Should read: -- -O-, -CO-O-, or -O-CO- --

Signed and Sealed this

Sixteenth Day of November, 2010

David J. Kappos
*Director of the United States Patent and Trademark Office*